(12) United States Patent
Nisperos

(10) Patent No.: US 9,539,679 B2
(45) Date of Patent: Jan. 10, 2017

(54) ALIGNMENT TOOL

(71) Applicant: The Boeing Company, Chicago, IL (US)

(72) Inventor: Oscar Villanueva Nisperos, Lynnwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 245 days.

(21) Appl. No.: 14/447,783

(22) Filed: Jul. 31, 2014

(65) Prior Publication Data

US 2016/0031052 A1 Feb. 4, 2016

(51) Int. Cl.
*B23P 19/10* (2006.01)
*G01B 5/25* (2006.01)
*G02B 27/01* (2006.01)

(52) U.S. Cl.
CPC ............. *B23P 19/10* (2013.01); *G01B 5/25* (2013.01); *G02B 27/0149* (2013.01)

(58) Field of Classification Search
CPC ............. B23P 19/10; B23P 19/12; G01B 5/25
USPC .......................... 33/645, 1 BB, 501.05, 613
See application file for complete search history.

(56) References Cited

U.S. PATENT DOCUMENTS

| | | | | |
|---|---|---|---|---|
| 4,360,974 A | * | 11/1982 | de Cuissart | B23Q 1/545 33/567 |
| 6,070,336 A | * | 6/2000 | Rodgers | E04G 21/1891 33/370 |
| 6,378,192 B1 | * | 4/2002 | Ohmi | F16K 27/003 269/47 |
| 6,880,258 B2 | * | 4/2005 | Adams | G01C 9/00 33/318 |
| 7,497,029 B2 | * | 3/2009 | Plassky | A61B 17/15 269/254 CS |
| 7,900,368 B2 | * | 3/2011 | Cerwin | E01B 35/02 33/287 |
| 8,051,547 B2 | * | 11/2011 | Toh | B21J 15/14 29/464 |
| 8,220,174 B1 | * | 7/2012 | Shwaiheen | G01B 5/25 33/529 |
| 8,566,054 B1 | * | 10/2013 | Schweigert | B64F 5/0045 702/144 |
| 8,800,156 B2 | * | 8/2014 | Sullivan | G01B 3/14 33/1 BB |
| 9,302,787 B2 | * | 4/2016 | Hafenrichter | B64F 5/0018 |
| 2014/0165359 A1 | * | 6/2014 | Holmes | F01D 9/023 29/407.1 |
| 2015/0020394 A1 | * | 1/2015 | Spomer | G02B 7/004 33/533 |

* cited by examiner

*Primary Examiner* — Christopher Fulton
(74) *Attorney, Agent, or Firm* — Yee & Associates, P.C.

(57) ABSTRACT

A method and apparatus for installing alignment of fastener assemblies. The method comprises placing an alignment tool on a reference datum. The method also takes pitch, roll, and yaw readings from an instrument associated with the alignment tool. Further, the method positions the alignment tool relative to a number of holes. Still further, the method adjusts the alignment tool based on pitch, roll, and yaw readings. The method also installs a first fastener assembly relative to a first hole of the number of holes.

20 Claims, 22 Drawing Sheets

ALIGNMENT TOOL

BACKGROUND INFORMATION

1. Field

The present disclosure relates generally to methods and apparatuses for the installation and alignment of fasteners. More particularly, the present disclosure relates to the installation and alignment of fasteners for head-up display projectors in the cockpit of an aircraft.

2. Background

In manufacturing an aircraft, placement of materials is important to quality of the aircraft. Further, proper alignment of structures of the aircraft is important for safe and proper functioning of the aircraft.

Currently, proper alignment of structures may be determined through surveying the aircraft with expensive and complicated tools. These tools may include laser trackers and total stations. These tools may not operate well in outdoor environments and may require experienced personnel to operate. The process of determining alignment of a structure on an aircraft may also be called boresighting.

Structures may be attached to the aircraft using fastener assemblies. These fastener assemblies may be aligned in the aircraft by boresighting. After aligning the fastener assemblies, the fastener assemblies may be installed and secured with epoxy potting material. After curing, these fastener assemblies are non-adjustable. The potting material is hard and requires removal to reposition or realign the fastener assemblies. Removing the potting material and accompanying the fastener may take an undesirable amount of energy and time.

Pilots of modern commercial aircraft utilize a number of means to monitor, manage, and control various aspects of their flight and the systems on their aircraft. One means of monitoring the flight includes a head-up display. A head-up display may include a transparent display to allow for display of data without requiring users to look away from their viewpoints. The data is projected onto the transparent display or sometimes an aircraft window by a projector.

A head-up display may display navigation data. It is important to the accuracy of the displayed navigation data that the head-up display projector be properly mounted relative to boresights on the aircraft.

The head-up display projector may be mounted to the aircraft by connecting captive fasteners of the head-up display projector to alignment sockets of fastener assemblies in the aircraft. The fastener assemblies are aligned relative to boresights of the aircraft.

If the fastener assemblies are aligned incorrectly, the head-up display will not function correctly. Before mounting the head-up display projector, the alignment of the fastener assemblies should be verified. If the alignment is incorrect for a fastener assembly, the fastener assembly and potting material would be removed and a new fastener assembly and potting material installed. This process would be time-consuming and costly.

Therefore it would be desirable to have a tool that overcomes issues that occur with current techniques for structure alignment. Further, it would be desirable to have a tool that overcomes issues that occur with realigning structures. Additionally, it would be desirable to have a method and apparatus that take into account at least some of the issues discussed above, as well as other possible issues.

SUMMARY

An illustrative embodiment of the present disclosure provides a tool. The tool comprises a base having an instrument platform, and an alignment portion having a footprint of a head-up display projector of an aircraft.

Another illustrative embodiment of the present disclosure provides a tool. The tool comprises a base and an alignment portion. The base has a first face configured to contact a reference datum, an instrument platform on a second face, and an alignment feature. The alignment portion has a number of captive fasteners.

A further illustrative embodiment of the present disclosure provides a method. The method comprises placing an alignment tool on a reference datum. The method also takes pitch, roll, and yaw readings from an instrument associated with the alignment tool while the alignment tool is on the reference datum. Further, the method positions the alignment tool relative to a number of holes. Still further, the method adjusts the alignment tool based on pitch, roll, and yaw readings. The method also installs a first fastener assembly relative to a first hole of the number of holes.

Another illustrative embodiment of the present disclosure provides a method. The method comprises placing an alignment tool on a reference datum. The method also takes pitch, roll, and yaw readings from an instrument associated with the alignment tool while the alignment tool is on the reference datum. Further, the method positions the alignment tool relative to a number of fastener assemblies. Still further, the method takes the pitch, the roll, and the yaw readings from the instrument associated with the alignment tool while positioned relative to the number of fastener assemblies.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that it may be desirable to have adjustable fastener assemblies. Specifically, adjustable fastener assemblies may reduce manufacturing time, energy, and expense. Further, the illustrative embodiments recognize and take into account that an alignment tool which may be used in the field to verify alignment of fastener assemblies may be desirable.

Therefore, there is a need for a tool to align fastener assemblies relative to a reference datum in the aircraft. Therefore, there is also a need for a tool to determine alignment of installed fasteners. Likewise, there is a need for alignment fasteners which maintain alignment in the aircraft without the use of potting material.

Figure 1:
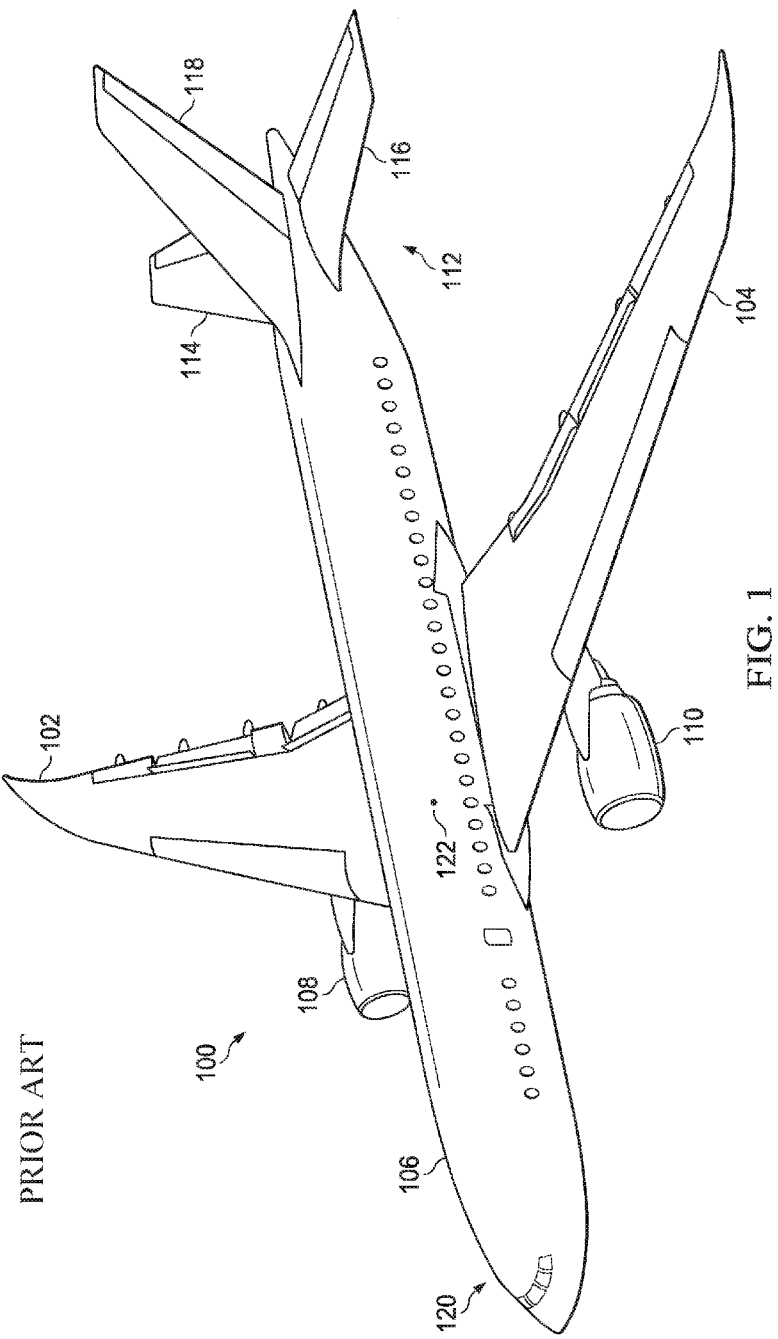
FIG. 1 is an illustration of an aircraft in which an illustrative embodiment may be implemented.

With reference now to the figures, and in particular, with reference to FIG. 1, an illustration of an aircraft is depicted in which an illustrative embodiment may be implemented. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106. Body 106 also has cockpit 120. Cockpit 120 is positioned in the front of aircraft 100. Reference datum 122 may be positioned in body 106 of aircraft 100. Specifically, reference datum 122 may be positioned above a wing box connecting wing 102 and wing 104. Reference datum 122 is a reference point from which a reading may be made. In some illustrative examples, reference datum 122 may be a physical reference point.

Aircraft 100 is an example of an aircraft in which a number of fastener assemblies and an alignment tool may be implemented in accordance with an illustrative embodiment. For example, a number of fastener assemblies may be used to mount a head-up display projector in cockpit 120. Further, a number of fastener assemblies may be aligned based on reference datum 122. Further, an alignment tool may be used to install a number of fastener assemblies in cockpit 120 of aircraft 100. Yet further, an alignment tool may be used to check the alignment of a number of fastener assemblies against reference datum 122. As used herein, "a number of," when used with reference to items means one or more items.

This illustration of aircraft 100 is provided for purposes of illustrating one environment in which the different illustrative embodiments may be implemented. The illustration of aircraft 100 in FIG. 1 is not meant to imply architectural limitations as to the manner in which different illustrative embodiments may be implemented. For example, aircraft 100 is shown as a commercial passenger aircraft. The different illustrative embodiments may be applied to other types of aircraft, such as private passenger aircraft, a rotorcraft, and other suitable type of aircraft.

Figure 2:
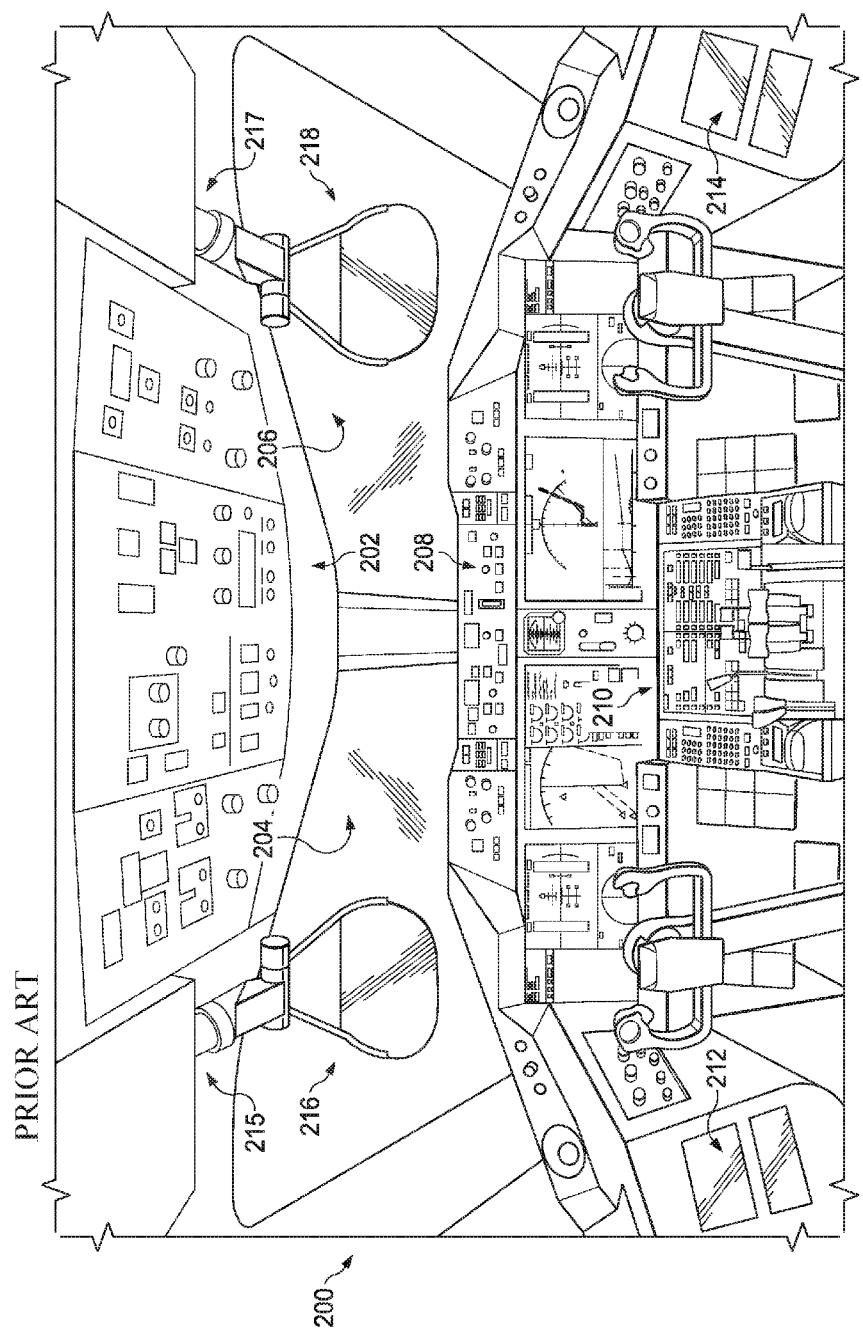
FIG. 2 is an illustration of a general arrangement of a cockpit in accordance with an illustrative embodiment.

Turning now to FIG. 2, an illustration of a general arrangement of a cockpit is depicted in accordance with an illustrative embodiment. Cockpit 200 may be a layout of cockpit 120 in aircraft 100 of FIG. 1. Cockpit 200 includes overhead panel 202, forward window 204, forward window 206, glare shield 208, forward instrument panel 210, sidewall 212, sidewall 214, head-up display projector 215, head-up display screen 216, head-up display projector 217, and head-up display screen 218. A number of displays and flight instruments may be present on overhead panel 202, glare shield 208, forward instrument panel 210, sidewall 212, and sidewall 214.

As depicted, head-up display screen 216 and head-up display screen 218 are transparent displays. Head-up display screen 216 and head-up display screen 218 may display data projected by head-up display projector 215 and head-up display projector 217 without requiring users to look away from their viewpoints. Head-up display screen 216 and head-up display screen 218 are depicted as mounted head-up display screens. Head-up display projector 215, head-up display screen 216, head-up display projector 217, and head-up display screen 218 are mounted to cockpit 200. In the illustrative example, alignment of head-up display projector 215 and head-up display projector 217 is important to the accuracy of information displayed on head-up display screen 216 and head-up display screen 218.

Alignment of head-up display projector 215 and head-up display projector 217 may be dependent on manufacturing of the aircraft. Manufacturing of the aircraft may create variations specific to the aircraft. Accordingly, manufacturing variations in the aircraft may affect the proper alignment of head-up display projector 215 and head-up display projector 217.

In attaching head-up display projector 215 and head-up display projector 217, individual variations of the aircraft are taken into account. In one illustrative example, head-up display projector 215 and head-up display projector 217 may each be attached to a respective bracket in cockpit 200. In other illustrative examples, head-up display projector 215 and head-up display projector 217 may be attached to cockpit 200 by securing head-up display projector 215 and head-up display projector 217 to a plurality of structures.

Figure 3:
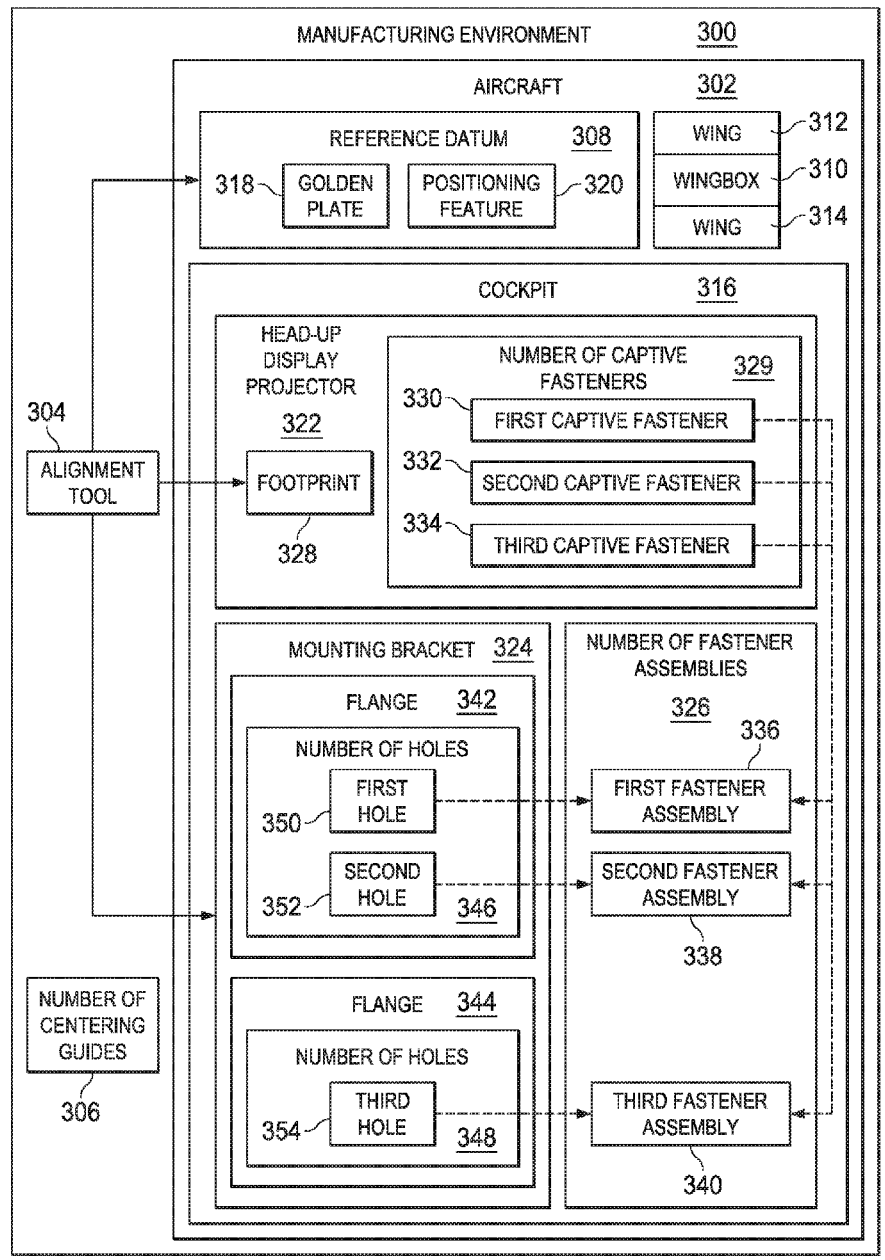
FIG. 3 is an illustration of a block diagram of a manufacturing environment in accordance with an illustrative embodiment.

Turning now to FIG. 3, an illustration of a block diagram of a manufacturing environment is depicted in accordance with an illustrative embodiment. Manufacturing environment 300 may be used to install a number of fastener assemblies in an aircraft. Manufacturing environment 300 may be used to install or verify alignment of head-up display projectors such as head-up display projector 215 and head-up display projector 217 of FIG. 2.

Aircraft 302, alignment tool 304, and number of centering guides 306 are present in manufacturing environment 300. Aircraft 302 includes reference datum 308, wingbox 310, wing 312, wing 314, and cockpit 316.

Reference datum 308 may be positioned over wingbox 310 which connects wing 312 and wing 314 of aircraft 302. Reference datum 308 is used in this illustrative example to determine alignment of aircraft 302. Alignment of aircraft 302 may be influenced by the manufacturing of aircraft 302. Specifically, alignment of aircraft 302 may be influenced by variations during the manufacturing of aircraft 302. The alignment of aircraft 302 may include pitch, roll, and yaw readings. Pitch, roll, and yaw readings may be taken relative to reference datum 308.

In this illustrative example, reference datum 308 takes the form of golden plate 318. Golden plate 318 may be a triangular plate attached to aircraft 302. In some examples, golden plate 318 may be attached to aircraft 302 above wingbox 310.

Alignment of aircraft 302 may be determined by positioning alignment tool 304 relative to reference datum 308. In some examples, alignment tool 304 may be placed onto golden plate 318 to determine alignment of aircraft 302. After placing alignment tool 304 on golden plate 318, pitch, roll, and yaw readings may be taken by alignment tool 304.

Placement of alignment tool 304 relative to golden plate 318 may be important to measuring alignment of aircraft 302 accurately. Reference datum 308 may include positioning feature 320. In some examples, alignment tool 304 may be positioned relative to golden plate 318 using positioning feature 320. Positioning feature 320 may aid placement of alignment tool 304 so that readings of alignment of aircraft 302 may be done accurately. Positioning feature 320 may be at least one of a rod, a hole, a flange, a ledge, a channel, or other desirable feature. Positioning feature 320 may be selected to interface with a positioning feature of alignment tool 304.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present.

In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

Cockpit 316 includes head-up display projector 322, mounting bracket 324, and number of fastener assemblies 326. As depicted, head-up display projector 322 is mounted to mounting bracket 324 in cockpit 316 using number of fastener assemblies 326.

Head-up display projector 322 has footprint 328. Footprint 328 may be the area covered by head-up display projector 322. Footprint 328 may include positioning of number of captive fasteners 329. Number of captive fasteners 329 are fasteners designed for a permanent hold within a tool or structure. Specifically, number of captive fasteners 329 are fasteners designed for a permanent hold within head-up display projector 322. Using number of captive fasteners 329 provides a secure joining, and avoids fastener loss or damage that might be caused by a loose part.

In one illustrative example, number of captive fasteners 329 includes first captive fastener 330, second captive fastener 332, and third captive fastener 334. Number of captive fasteners 329 may be used to mount head-up display projector 322 to mounting bracket 324. Specifically, each of number of captive fasteners 329 may interface with a respective fastener assembly of number of fastener assemblies 326. Number of fastener assemblies 326 may include first fastener assembly 336, second fastener assembly 338, and third fastener assembly 340.

Number of fastener assemblies 326 may be connected to mounting bracket 324. As depicted, mounting bracket 324 has flange 342 and flange 344. Flange 342 may include number of holes 346.

In this illustrative example, flange 344 may include number of holes 348. In this illustrative example, number of holes 346 includes first hole 350 and second hole 352. In this illustrative example, number of holes 348 includes third hole 354.

First fastener assembly 336 is associated with first hole 350. Specifically, in some illustrative examples, first fastener assembly 336 is connected to mounting bracket 324 via first hole 350. In these examples, portions of first fastener assembly 336 extend through first hole 350.

Second fastener assembly 338 is associated with second hole 352. Specifically, in some illustrative examples, second fastener assembly 338 is connected to mounting bracket 324 via second hole 352. In these examples, portions of second fastener assembly 338 may extend through second hole 352.

Third fastener assembly 340 is associated with third hole 354. Specifically, in some illustrative examples, third fastener assembly 340 is connected to mounting bracket 324 via third hole 354. In these examples, portions of third fastener assembly 340 may extend through third hole 354.

To mount head-up display projector 322 to mounting bracket 324, number of captive fasteners 329 are connected to number of fastener assemblies 326. Specifically, first captive fastener 330 is connected to first fastener assembly 336, second captive fastener 332 is connected to second fastener assembly 338, and third captive fastener 334 is connected to third fastener assembly 340.

In some illustrative examples, alignment tool 304 is used to install number of fastener assemblies 326. In these examples, prior to installation in mounting bracket 324, number of fastener assemblies 326 is associated with alignment tool 304. Alignment tool 304 may be positioned relative to mounting bracket 324 while number of fastener assemblies 326 are associated with alignment tool 304. While alignment tool 304 is positioned relative to mounting bracket 324, number of centering guides 306 may be used to position number of fastener assemblies 326 relative to number of holes 346 and number of holes 348. Specifically, in some illustrative examples, number of centering guides 306 are used to center portions of number of fastener assemblies 326 relative to number of holes 346 and number of holes 348.

Figure 4:
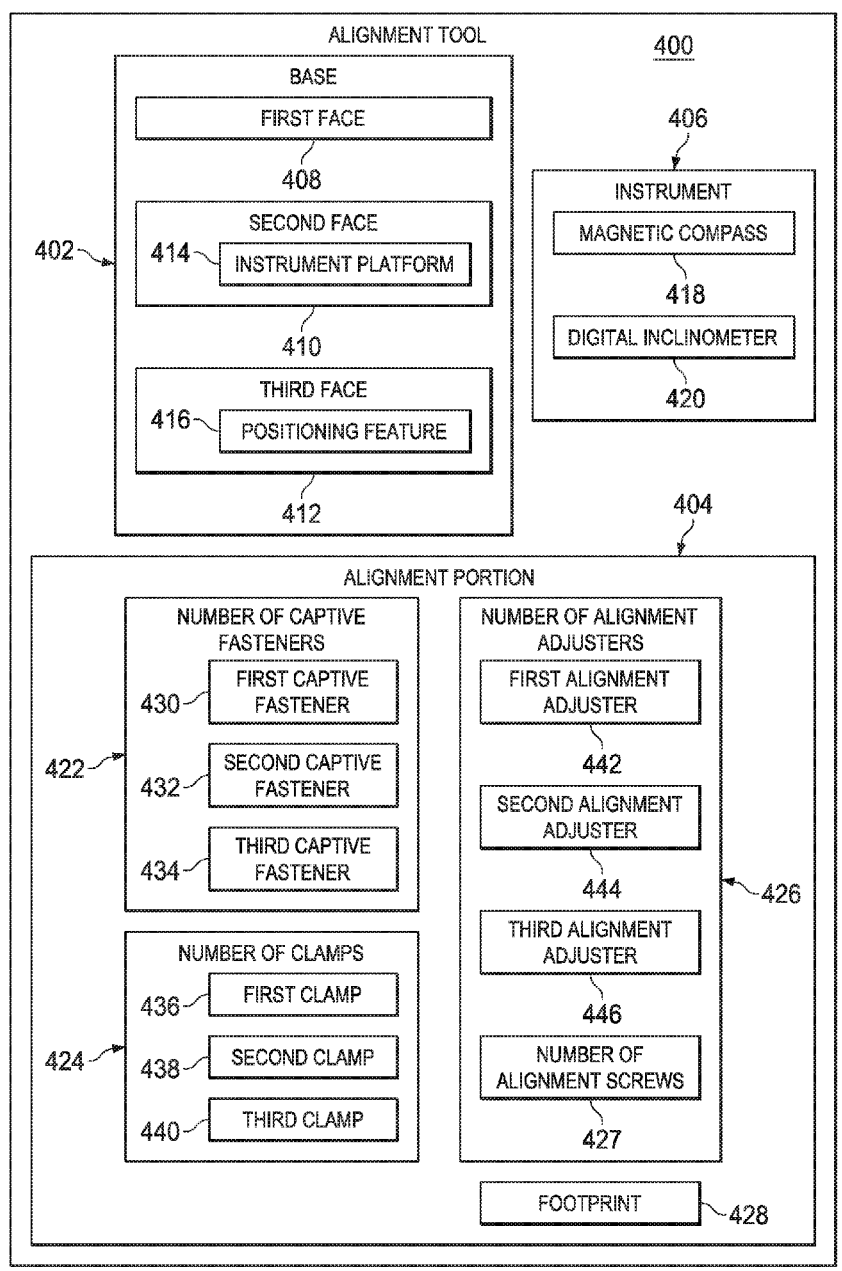
FIG. 4 is an illustration of a block diagram of an alignment tool in accordance with an illustrative embodiment.

Turning now to FIG. 4, an illustration of a block diagram of an alignment tool is depicted in accordance with an illustrative embodiment. Alignment tool 400 may be a detailed block diagram of alignment tool 304 in FIG. 3. Alignment tool 400 includes base 402, alignment portion 404, and instrument 406. As depicted, base 402 includes first face 408, second face 410, and third face 412. First face 408 may be opposite second face 410. First face 408 may be placed against a reference datum, such as reference datum 308 of FIG. 3.

In this illustrative example, second face 410 includes instrument platform 414. In some examples, instrument platform 414 interfaces with instrument 406. Specifically, instrument 406 may rest on instrument platform 414 of second face 410.

In some examples, third face 412 includes positioning feature 416. Positioning feature 416 may aid placement of alignment tool 400 so that readings of alignment of an aircraft may be done accurately. Positioning feature 416 may be used in conjunction with positioning feature 320 of reference datum 308 of FIG. 3. Positioning feature 416 used in conjunction with positioning feature 320 of reference datum 308 of FIG. 3 may aid placement of alignment tool 400 so that readings of alignment of an aircraft, such as aircraft 302, may be done accurately. In some illustrative examples, positioning feature 416 may be at least one of a rod, a hole, a flange, a ledge, a channel, or other desirable feature.

Following positioning of alignment tool 400 relative to a reference datum, the pitch, roll, and yaw readings may be taken using instrument 406 resting on instrument platform 414. In some illustrative examples, instrument 406 may be magnetic compass 418. In some illustrative examples, instrument 406 may be digital inclinometer 420. In some illustrative examples, alignment tool 400 may have both magnetic compass 418 and digital inclinometer 420.

After taking the pitch, roll, and yaw readings, alignment tool 400 may be moved from the reference datum. Alignment tool 400 may be moved to position alignment tool 400 relative to a number of holes, such as number of holes 346 of mounting bracket 324. Alignment portion 404 may be positioned relative to the number of holes. In some illustrative examples, alignment portion 404 may face the number of holes.

Alignment portion 404 includes number of captive fasteners 422, number of clamps 424, number of alignment adjusters 426, and footprint 428. Footprint 428 may be the same or substantially similar to footprint 328 of head-up display projector 322 of FIG. 3.

Number of captive fasteners 422 may align with the number of holes. Number of captive fasteners 422 may interact with a number of fastener assemblies. Number of captive fasteners 422 may be connected to a number of fastener assemblies. As depicted, number of captive fasteners 422 includes first captive fastener 430, second captive fastener 432, and third captive fastener 434. First captive fastener 430 may connect to first fastener assembly 336 of FIG. 3. Second captive fastener 432 may connect to second fastener assembly 338 of FIG. 3. Third captive fastener 434 may connect to third fastener assembly 340 of FIG. 3.

Number of clamps 424 may secure alignment tool 400 to a bracket, such as mounting bracket 324 in FIG. 3. Number of clamps 424 may include first clamp 436, second clamp 438, and third clamp 440. In some illustrative examples, first clamp 436 may be associated with first captive fastener 430. First clamp 436 may be positioned substantially near first captive fastener 430. In some illustrative examples, second clamp 438 may be associated with second captive fastener 432. Second clamp 438 may be positioned substantially near second captive fastener 432. In some illustrative examples, third clamp 440 may be associated with third captive fastener 434. Third clamp 440 may be positioned substantially near third captive fastener 434.

Number of alignment adjusters 426 may adjust the alignment of alignment tool 400 relative to a bracket such as mounting bracket 324 of FIG. 3. Specifically, number of alignment adjusters 426 may change at least one of the pitch, roll, and yaw of alignment tool 400.

In some illustrative examples, number of alignment adjusters 426 may be number of alignment screws 427. As depicted, number of alignment adjusters 426 includes first alignment adjuster 442, second alignment adjuster 444, and third alignment adjuster 446.

First alignment adjuster 442 may be positioned substantially near first captive fastener 430. In some examples, first alignment adjuster 442 may be positioned substantially near first clamp 436. First alignment adjuster 442 may be used to adjust a position of a first fastener assembly such as first fastener assembly 336 of FIG. 3.

Second alignment adjuster 444 may be positioned substantially near second captive fastener 432. In some examples, second alignment adjuster 444 may be positioned substantially near second clamp 438. Second alignment adjuster 444 may be used to adjust a position of a second fastener assembly such as second fastener assembly 338 of FIG. 3.

Third alignment adjuster 446 may be positioned substantially near third captive fastener 434. In some examples, third alignment adjuster 446 may be positioned substantially near third clamp 440. Third alignment adjuster 446 may be used to adjust a position of a third fastener assembly such as third fastener assembly 340 of FIG. 3.

Figure 5:
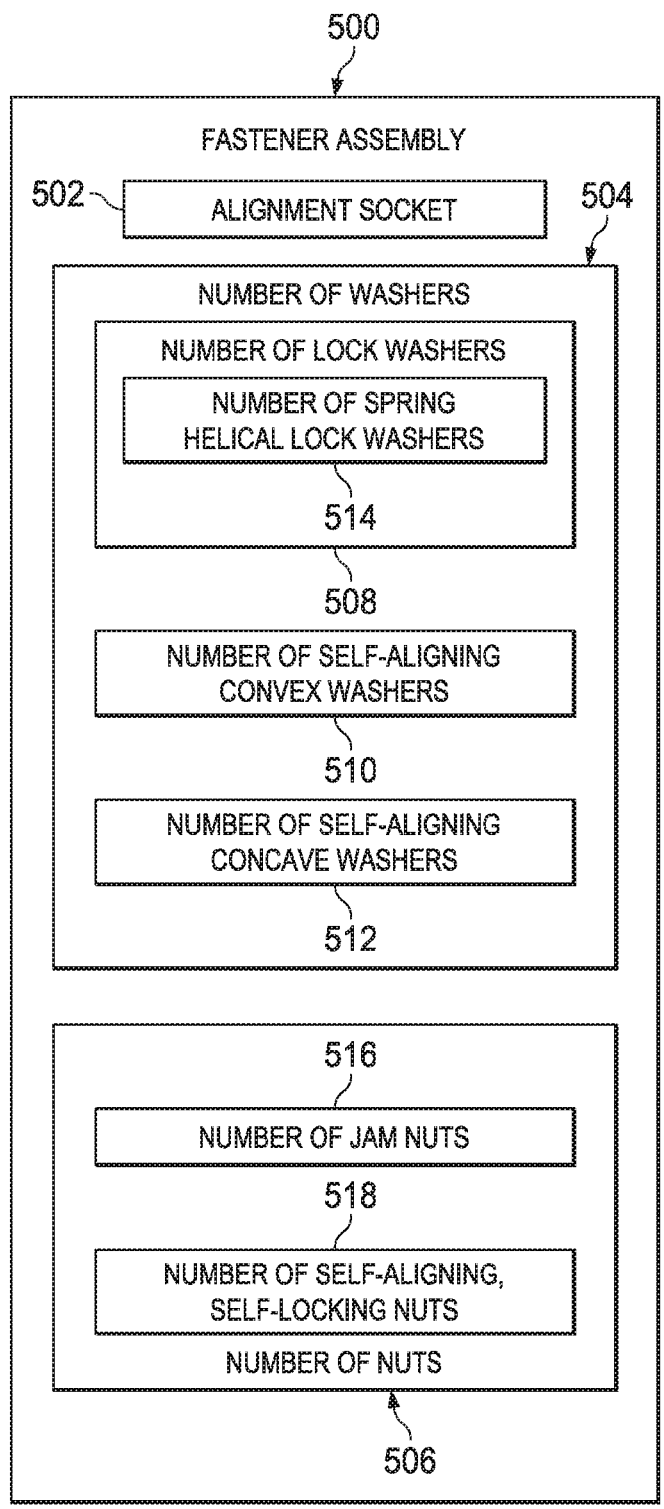
FIG. 5 is an illustration of a block diagram of a fastener assembly in accordance with an illustrative embodiment.

Turning now to FIG. 5, an illustration of a block diagram of a fastener assembly is depicted in accordance with an illustrative embodiment. Fastener assembly 500 may be an example of a fastener assembly of number of fastener assemblies 326 in FIG. 3. Fastener assembly 500 may hold its alignment relative to a structure without potting material. If the alignment of fastener assembly 500 is undesirable, fastener assembly 500 may be loosened, re-aligned within a hole, and then tightened. Further, fastener assembly 500 may be removed from a hole and then reinstalled in the same hole or a different hole. Fastener assembly 500 may maintain its alignment relative to the hole. Fastener assembly 500 may be installed with a longitudinal axis of fastener assembly 500 from about perpendicular to a bracket to up to about 8 degrees from perpendicular to a bracket.

Fastener assembly 500 includes alignment socket 502, number of washers 504, and number of nuts 506. Alignment socket 502 connects to a captive fastener such as at least one of number of captive fasteners 422 of FIG. 4 or number of captive fasteners 329 of FIG. 3. Specifically, a portion of a captive fastener may be received within alignment socket 502.

A portion of alignment socket 502 may be placed within a hole of a structure. A portion of alignment socket 502 may be placed within number of holes 346 or number of holes 348 of FIG. 3.

Number of washers 504 may include number of lock washers 508, number of self-aligning convex washers 510, and number of self-aligning concave washers 512. In some illustrative examples, number of lock washers 508 may take the form of number of spring helical lock washers 514. Number of nuts 506 may include at least one of number of jam nuts 516 and number of self-aligning self-locking nuts 518.

Figure 6:
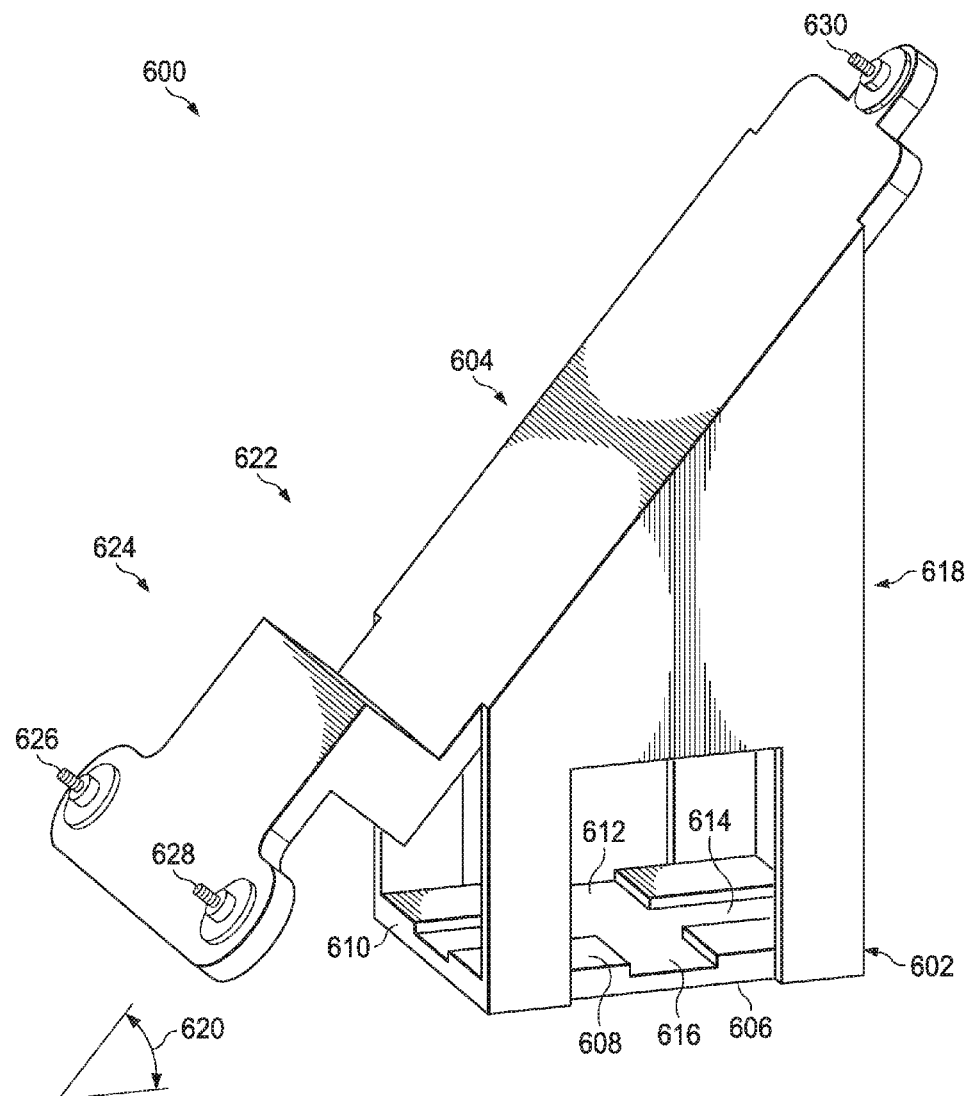
FIG. 6 is an illustration of an alignment tool in accordance with an illustrative embodiment.

Turning now to FIG. 6, an illustration of an alignment tool is depicted in accordance with an illustrative embodiment. Alignment tool 600 may be a physical depiction of one implementation of alignment tool 304 of FIG. 3. Alignment tool 600 may be a physical depiction of alignment tool 400 of FIG. 4.

Alignment tool 600 has base 602 and alignment portion 604. Base 602 has first face 606, second face 608, and third face 610. First face 606, as depicted, is substantially flat. First face 606 may be shaped to interface with a reference datum. Second face 608 has instrument platform 612.

As depicted, instrument platform 612 includes groove 614 and groove 616. Instruments may be positioned within instrument platform 612. At least one of groove 614 or groove 616 may position an instrument within alignment tool 600. At least one of groove 614 or groove 616 may allow for consistent positioning of an instrument within alignment tool 600.

Third face 610 may interact with a positioning feature of a reference datum. Specifically, third face 610 may be shaped to interface with a positioning feature of a reference datum to position alignment tool 600 relative to a reference datum.

Connecting section 618 connects base 602 to alignment portion 604. Connecting section 618 holds alignment portion 604 at angle 620 to base 602. Angle 620 may be substantially the same as an angle between a mounting bracket and a top of a reference datum in an aircraft.

Alignment portion 604 has footprint 622. Footprint 622 may be substantially the same as a footprint of an item to be mounted to a mounting bracket. As depicted, footprint 622 may be substantially the same as a footprint of a head-up display projector. Alignment portion 604 has number of captive fasteners 624. As depicted, number of captive fasteners 624 includes first captive fastener 626, second captive fastener 628, and third captive fastener 630. Number of captive fasteners 624 may be positioned in substantially the same locations as a number of captive fasteners in an item to be mounted to the mounting bracket.

Alignment tool 600, as depicted, may be used to verify the alignment of a number of installed fastener assemblies. First, alignment tool 600 may be placed on a reference datum. An instrument associated with instrument platform 612 may be used to take pitch, roll, and yaw readings. Alignment tool 600 may then be moved and positioned relative to a number of fastener assemblies. Number of captive fasteners 624 may be connected to the number of fastener assemblies. Afterwards, the instrument may be used to take pitch, roll, and yaw readings while alignment tool 600 is positioned relative to the number of fastener assemblies.

Figure 7:
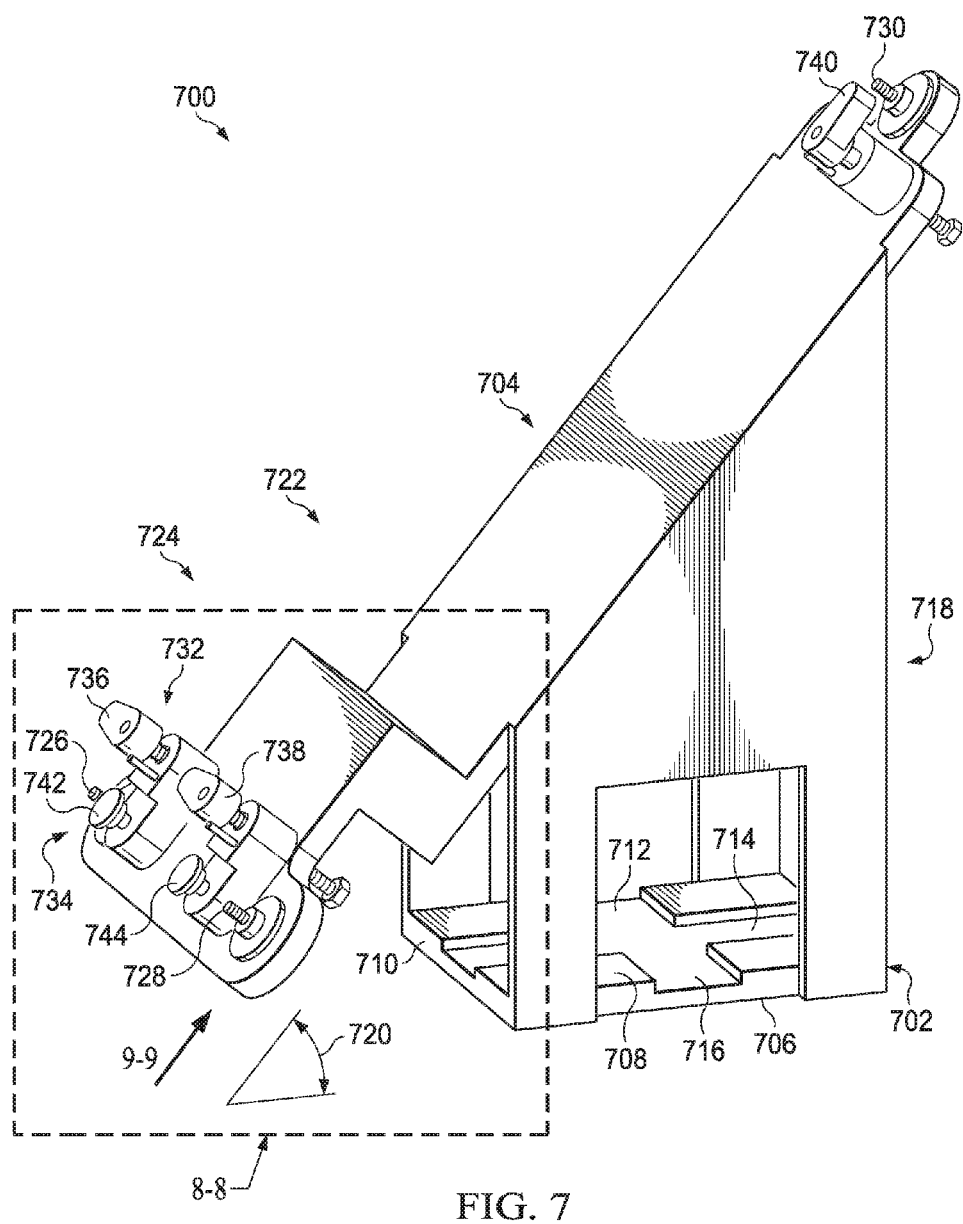
FIG. 7 is an illustration of an alignment tool configured to install a number of fastener assemblies in accordance with an illustrative embodiment.

Turning now to FIG. 7, an illustration of an alignment tool configured to install a number of fastener assemblies is depicted in accordance with an illustrative embodiment. Alignment tool 700 may be a physical depiction of one implementation of alignment tool 304 of FIG. 3. Alignment tool 700 may be a physical depiction of alignment tool 400 of FIG. 4. Alignment tool 700 may be alignment tool 600 with additional added features.

Alignment tool 700 has base 702 and alignment portion 704. Base 702 has first face 706, second face 708, and third face 710. First face 706, as depicted, is substantially flat. First face 706 may be shaped to interface with a reference datum. Second face 708 has instrument platform 712. As depicted, instrument platform 712 includes groove 714 and groove 716. Instruments may be positioned within instrument platform 712. At least one of groove 714 or groove 716 may position an instrument within alignment tool 700. At least one of groove 714 or groove 716 may allow for consistent positioning of an instrument within alignment tool 700.

Third face 710 may interact with a positioning feature of a reference datum. Specifically, third face 710 may be shaped to interface with a positioning feature of a reference datum to position alignment tool 700 relative to a reference datum.

Connecting section 718 connects base 702 to alignment portion 704. Connecting section 718 holds alignment portion 704 at angle 720 to base 702. Angle 720 may be substantially the same as an angle between a mounting bracket and a top of a reference datum in an aircraft.

Alignment portion 704 has footprint 722. Footprint 722 may be substantially the same as a footprint of an item to be mounted to a mounting bracket. As depicted, footprint 722 may be substantially the same as a footprint of a head-up display projector. Alignment portion 704 has number of captive fasteners 724. As depicted, number of captive fasteners 724 includes first captive fastener 726, second captive fastener 728, and third captive fastener 730. Number of captive fasteners 724 may be positioned in substantially the same locations as a number of captive fasteners in an item to be mounted to the mounting bracket.

Located substantially near each of number of captive fasteners 724 is number of clamps 732 and number of alignment adjusters 734. Number of clamps 732 may be used to secure alignment tool 700 to a bracket. Number of clamps 732 includes first clamp 736, second clamp 738, and third clamp 740. Each of number of clamps 732 may rotate about respective pivot points. Each of number of clamps 732 may rotate to secure alignment tool 700 to a bracket.

Number of alignment adjusters 734 may be used to change at least one of the pitch, roll, or yaw of alignment tool 700 when alignment tool 700 is secured to a bracket. As depicted, number of alignment adjusters 734 includes first alignment adjuster 742, second alignment adjuster 744, and a third alignment adjuster hidden by third clamp 740. In this illustrative example, number of alignment adjusters 734 takes the form of alignment screws. Number of alignment adjusters 734 in this illustrative example may be twisted up or down to change at least one of the pitch, roll, or yaw of alignment tool 700 when alignment tool 700 is secured to a bracket.

Alignment tool 700, as depicted, may be used to verify alignment of a number of fastener assemblies. Verification of alignment may occur as described in reference to FIG. 6.

Alternatively, alignment tool 700, as depicted, may be used to install a number of fastener assemblies. First, alignment tool 700 may be placed on a reference datum. An instrument associated with instrument platform 712 may be used to take pitch, roll, and yaw readings. A number of fastener assemblies are connected to number of captive fasteners 724. Alignment tool 700 may then be moved and positioned relative to a number of holes using number of clamps 732.

Pitch, roll, and yaw readings may be taken while alignment tool 700 is positioned relative to the number of holes. Number of alignment adjusters 734 may be used to adjust alignment tool 700 based on the pitch, roll, and yaw readings. Afterwards, a fastener assembly of the number of fastener assemblies is installed relative to a first hole of the number of holes.

Figure 8:
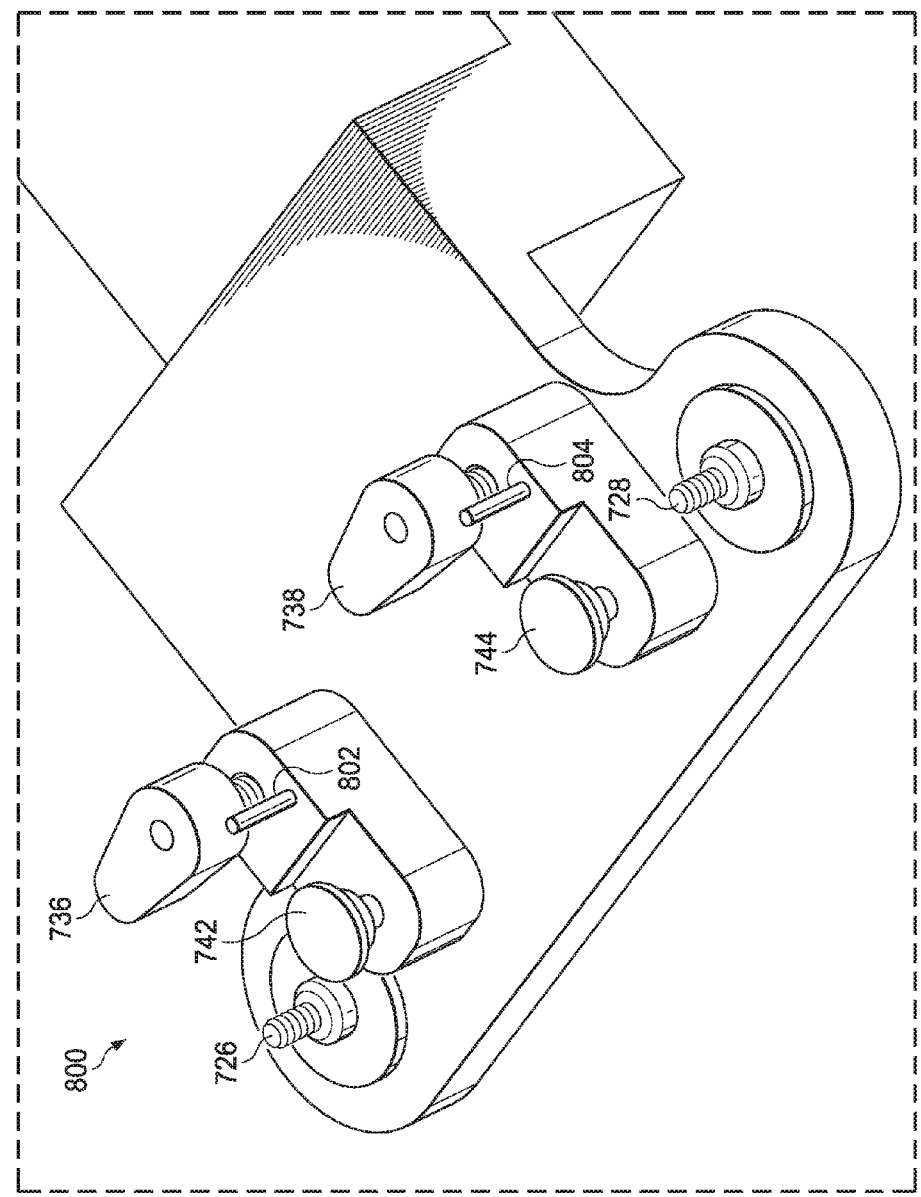
FIG. 8 is an illustration of an enlarged view of a portion of an alignment tool configured to install a number of fastener assemblies in accordance with an illustrative embodiment.

Turning now to FIG. 8, an illustration of an enlarged view of a portion of an alignment tool configured to install a number of fastener assemblies is depicted in accordance with an illustrative embodiment. View 800 is a view of alignment tool 700 within box 8-8 of FIG. 7.

As can be seen from view 800, stop 802 is associated with first clamp 736. Stop 804 is associated with second clamp 738. Stop 802 and stop 804 may prevent first clamp 736 and second clamp 738, respectively, from rotating an undesirable amount.

Figure 9:
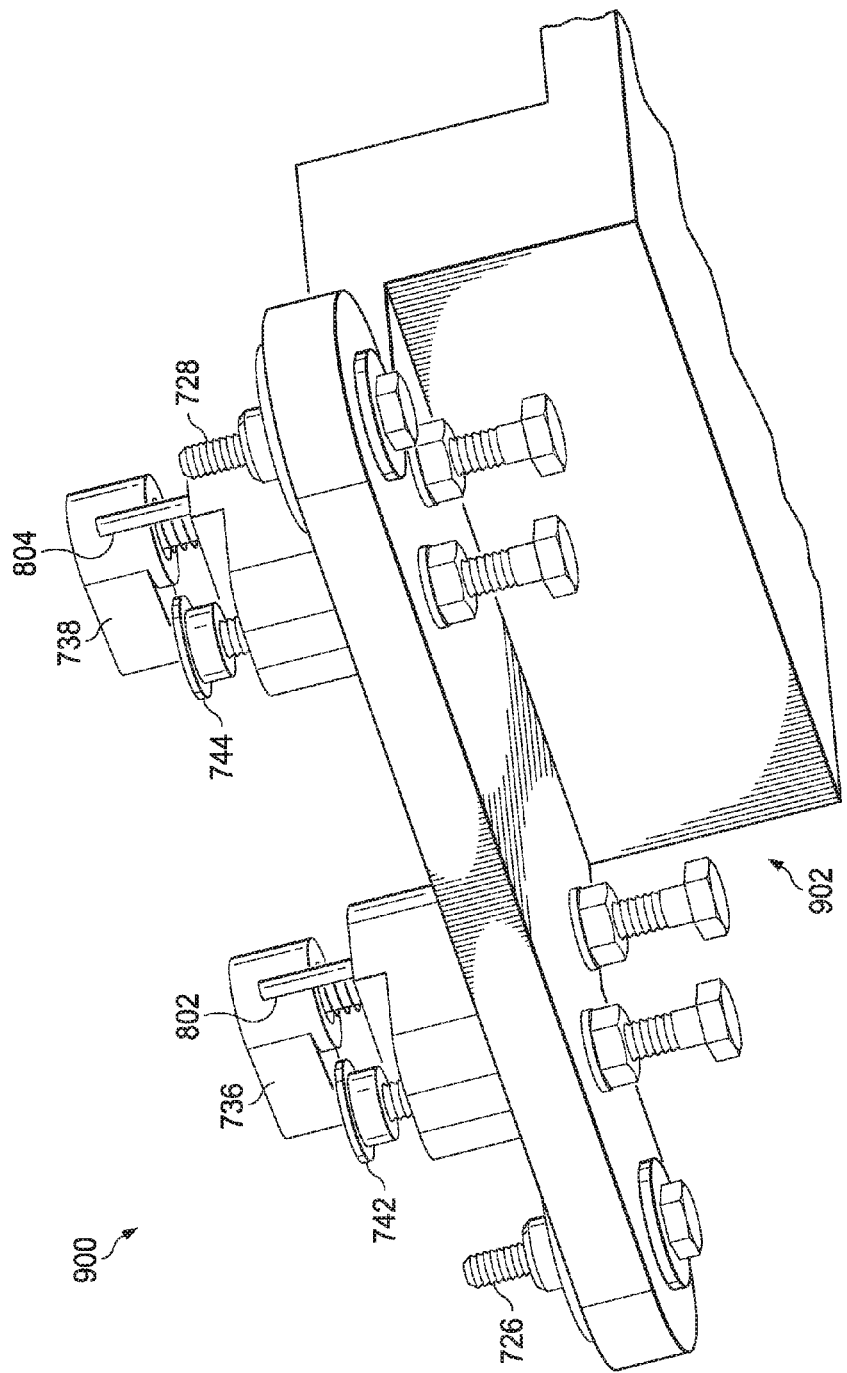
FIG. 9 is an illustration of an enlarged side view of a portion of an alignment tool configured to install a number of fastener assemblies in accordance with an illustrative embodiment.

Turning now to FIG. 9, an illustration of an enlarged side view of a portion of an alignment tool configured to install a number of fastener assemblies is depicted in accordance with an illustrative embodiment. View 900 may be a view of alignment tool 700 within box 8-8 from direction 9-9 of FIG. 7.

As depicted, number of connectors 902 connects first clamp 736, second clamp 738, first alignment adjuster 742, and second alignment adjuster 744 to alignment tool 700. In other illustrative examples, alternative mechanisms may connect first clamp 736, second clamp 738, first alignment adjuster 742, and second alignment adjuster 744 to alignment tool 700. For example, at least one of welds, staples, or other desirable connectors may be used.

Figure 10:
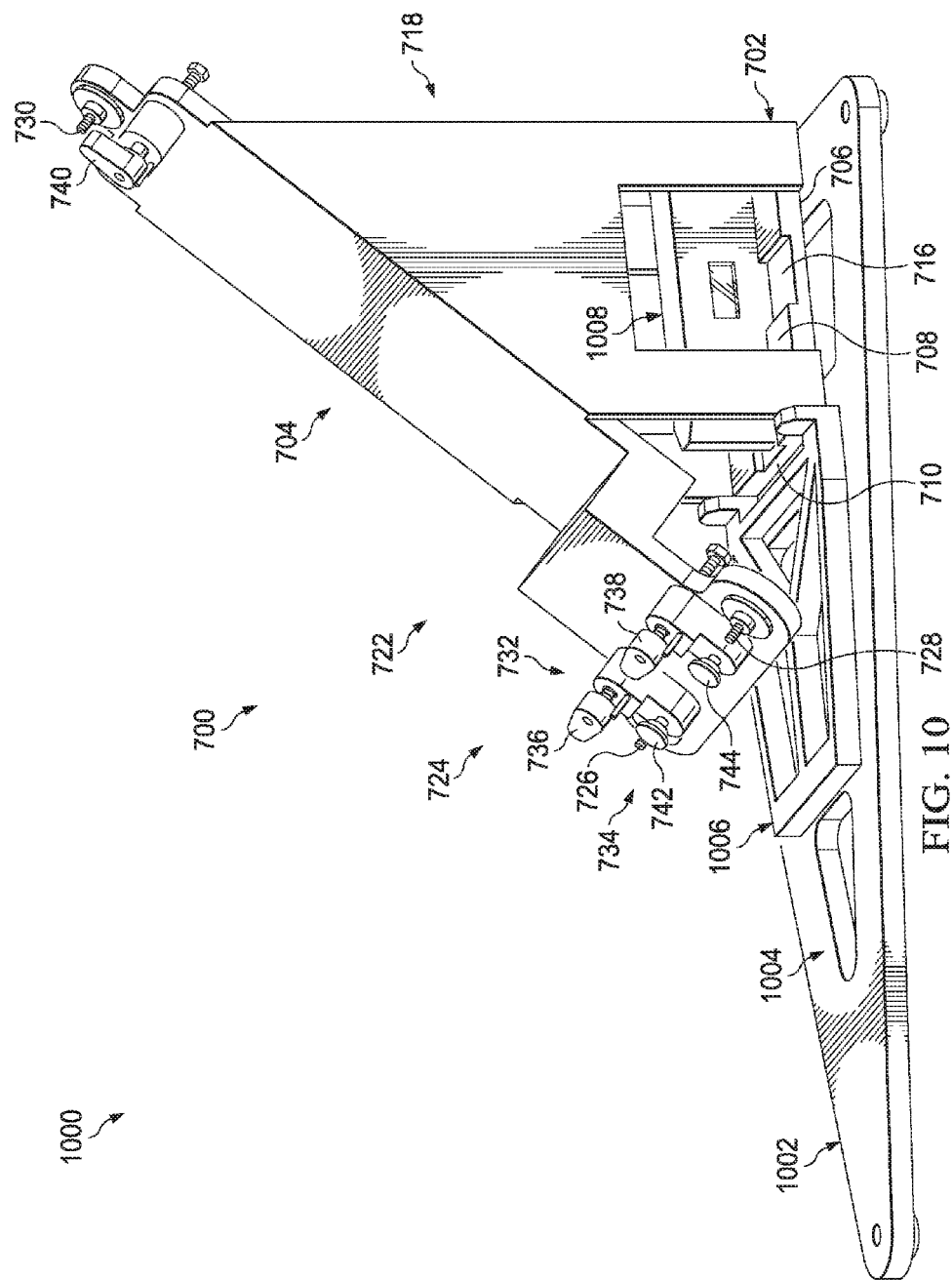
FIG. 10 is an illustration of an alignment tool configured to install a number of fastener assemblies positioned on a reference datum in accordance with an illustrative embodiment.

Turning now to FIG. 10, an illustration of an alignment tool configured to install a number of fastener assemblies positioned on a reference datum is depicted in accordance with an illustrative embodiment. Manufacturing environment 1000 includes reference datum 1002 and alignment tool 700. Manufacturing environment 1000 may be a physical implementation of manufacturing environment 300 of FIG. 3. Reference datum 1002 takes the form of golden triangle 1004. Reference datum 1002 has positioning feature 1006. Alignment tool 700 is positioned on reference datum 1002 such that third face 710 of base 702 of alignment tool 700 contacts positioning feature 1006. In this illustrative example, positioning feature 1006 takes the form of two flanges.

As depicted, instrument 1008 is present on instrument platform 712 of alignment tool 700. Instrument 1008 may be used to take pitch, roll, and yaw readings when alignment tool 700 is positioned on reference datum 1002.

Figure 11:
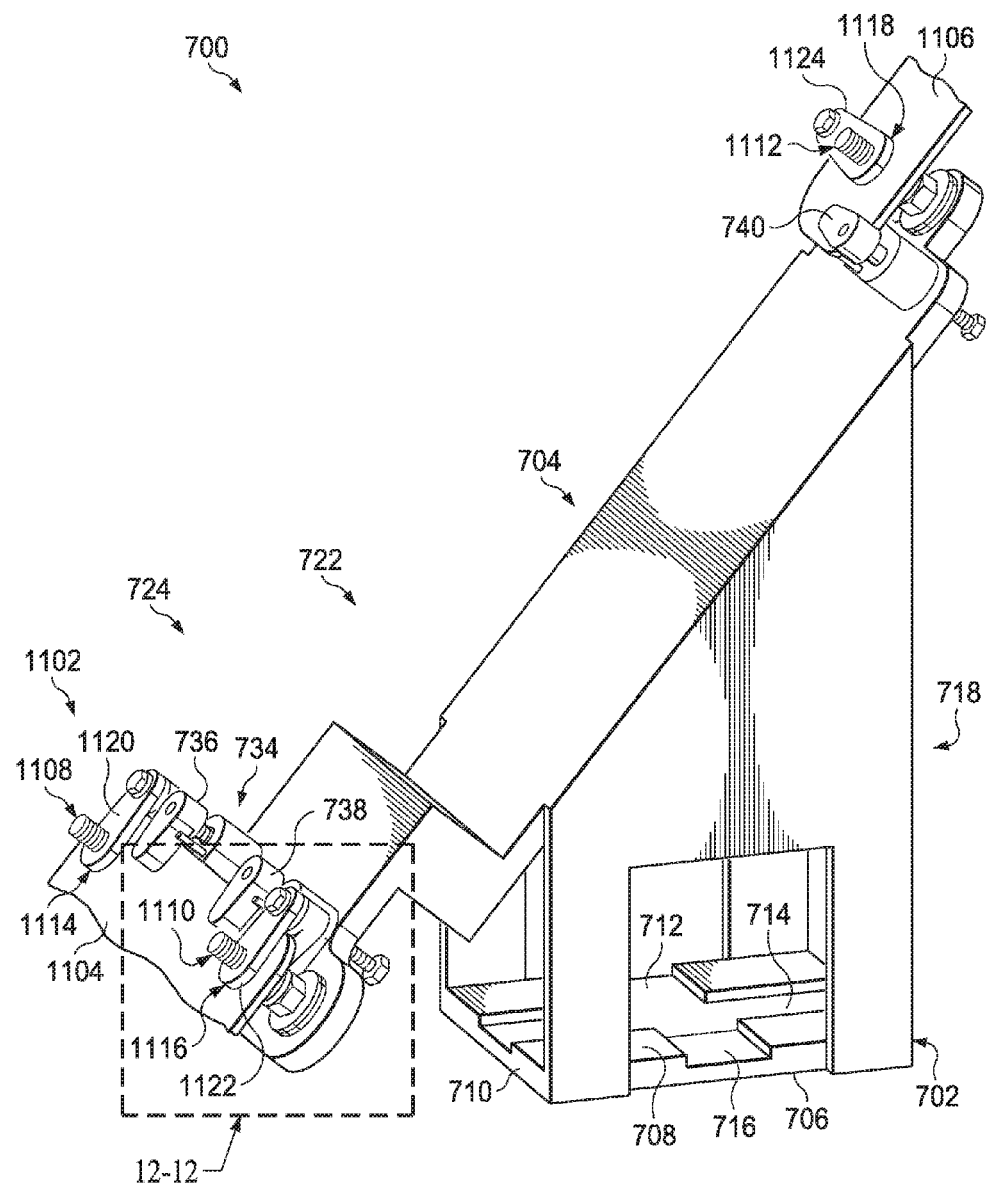
FIG. 11 is an illustration of a number of centering guides and an alignment tool configured to install a number of fastener assemblies attached to a bracket in accordance with an illustrative embodiment.

Turning now to FIG. 11, an illustration of a number of centering guides and an alignment tool configured to install a number of fastener assemblies attached to a bracket is depicted in accordance with an illustrative embodiment. Alignment tool 700 may be secured to bracket 1102 after being positioned on reference datum 1002 of FIG. 10. Bracket 1102 may be a physical implementation of mounting bracket 324 of FIG. 3. Bracket 1102 has flange 1104 and flange 1106. As depicted, alignment tool 700 is secured to flange 1104 by first clamp 736 and second clamp 738. Alignment tool 700 is secured to flange 1106 by third clamp 740.

First alignment socket 1108, second alignment socket 1110, and third alignment socket 1112 are connected to alignment tool 700 using number of captive fasteners 724. A portion of first alignment socket 1108 extends through first hole 1114. A portion of second alignment socket 1110 extends through second hole 1116. A portion of third alignment socket 1112 extends through third hole 1118.

First centering guide 1120 is positioned over first hole 1114 to center first alignment socket 1108 within first hole 1114. Second centering guide 1122 is positioned over second hole 1116 to center second alignment socket 1110 within second hole 1116. Third centering guide 1124 is positioned over third hole 1118 to center third alignment socket 1112 within third hole 1118.

As depicted, alignment tool 700 is positioned to install three fastener assemblies. Prior to installing a number of nuts and a number of washers over each of first alignment socket 1108, second alignment socket 1110, and third alignment socket 1112, each of first centering guide 1120, second centering guide 1122, and third centering guide 1124 will be removed.

For example, prior to installing a number of nuts and a number of washers over first alignment socket 1108, first centering guide 1120 will be removed. Prior to installing a number of nuts and a number of washers over second alignment socket 1110, second centering guide 1122 will be removed. Prior to installing a number of nuts and a number of washers over third alignment socket 1112, third centering guide 1124 will be removed.

Pitch, roll, and yaw readings of alignment tool 700 may be taken using instrument 1008, shown in FIG. 10, following the installation of a number of nuts and a number of washers over each of first alignment socket 1108, second alignment socket 1110, and third alignment socket 1112. For example, first centering guide 1120 may be removed. Afterwards, a number of nuts and a number of washers may be installed over first alignment socket 1108. Following installation of the number of nuts and the number of washers over first alignment socket 1108, pitch, roll, and yaw readings of alignment tool 700 may be taken using instrument 1008. If the pitch, roll, and yaw readings of alignment tool 700 are unacceptable, the number of washers and the number of nuts may be loosened, alignment tool 700 may be adjusted, and the number of washers and the number of nuts may be tightened. If the pitch, roll, and yaw readings of alignment tool 700 are acceptable, second centering guide 1122 may be removed. Afterwards, similar steps may be taken to install a number of nuts and a number of washers over second alignment socket 1110 and third alignment socket 1112.

Figure 12:
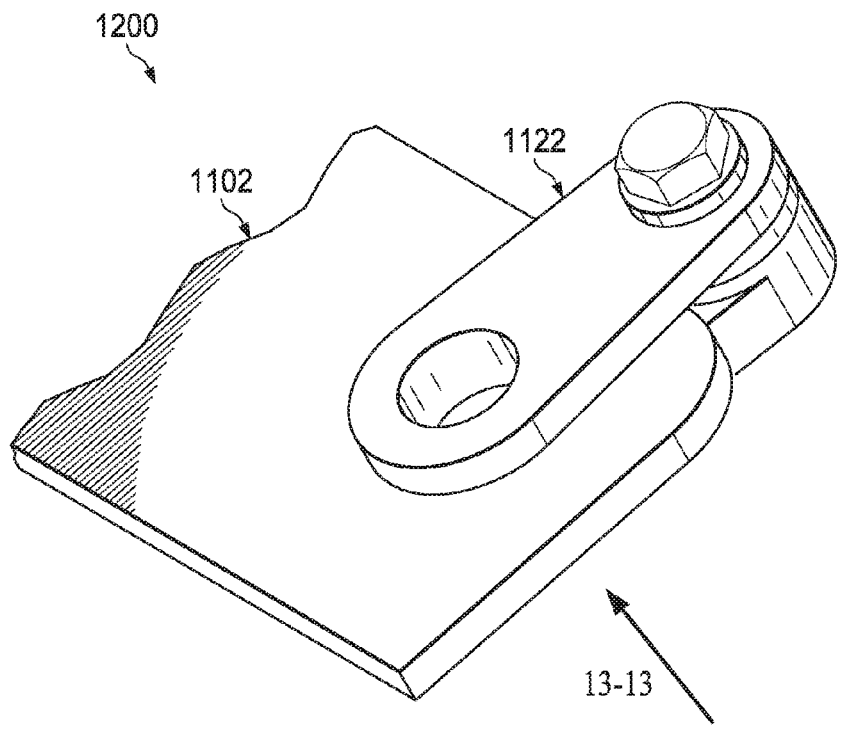
FIG. 12 is an illustration of a centering guide and a bracket in accordance with an illustrative embodiment.

Turning now to FIG. 12, an illustration of a centering guide and a bracket is depicted in accordance with an illustrative embodiment. View 1200 is a view of second centering guide 1122 and bracket 1102 from within box 12-12 of FIG. 11 prior to positioning alignment tool 700 relative to bracket 1102.

Figure 13:
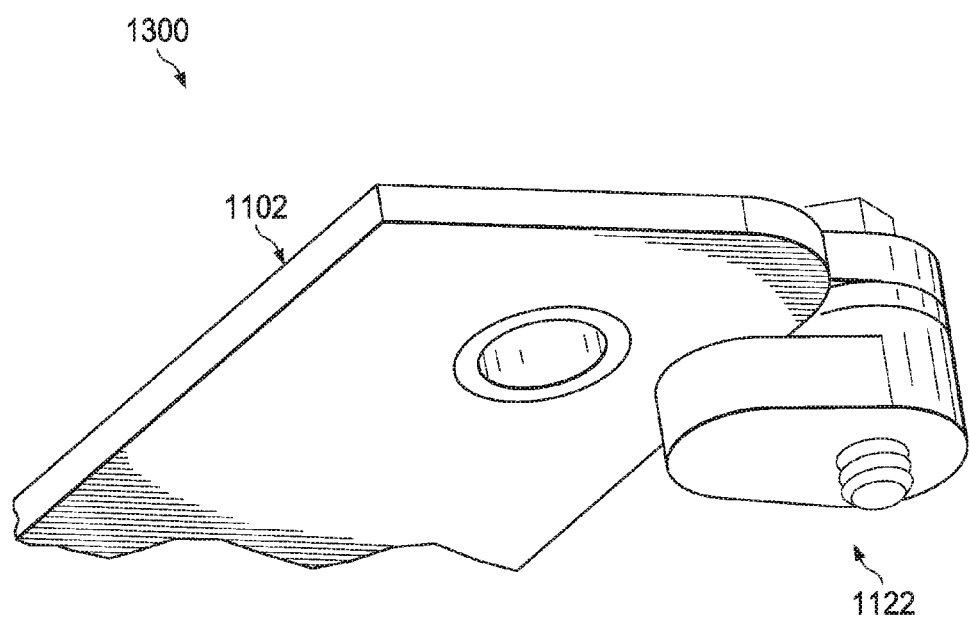
FIG. 13 is an illustration of a centering guide and a bracket in accordance with an illustrative embodiment.

Turning now to FIG. 13, an illustration of a centering guide and a bracket is depicted in accordance with an illustrative embodiment. View 1300 is a view of second centering guide 1122 and bracket 1102 from within box 12-12 of FIG. 11 and from direction 13-13 of FIG. 12 prior to positioning alignment tool 700 relative to bracket 1102.

Figure 14:
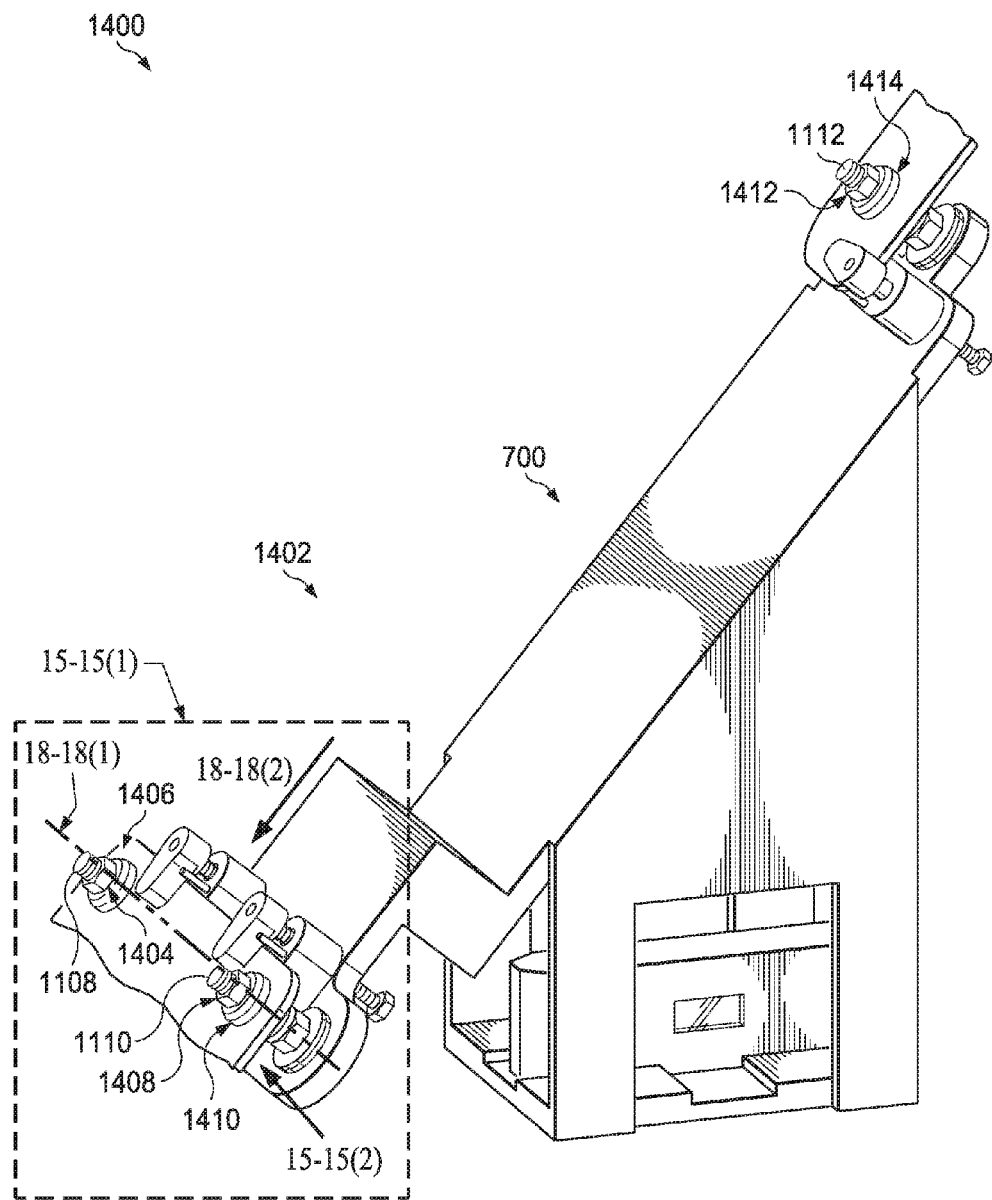
FIG. 14 is an illustration of a number of installed fastener assemblies and an alignment tool configured to install the number of fastener assemblies attached to a bracket in accordance with an illustrative embodiment.

Turning now to FIG. 14, an illustration of a number of installed fastener assemblies and an alignment tool configured to install the number of fastener assemblies attached to a bracket is depicted in accordance with an illustrative embodiment. Specifically, view 1400 is a view of alignment tool 700 and bracket 1102 following installation of number of fastener assemblies 1402. As can be seen from FIG. 14, first centering guide 1120, second centering guide 1122, and third centering guide 1124 have been removed.

Further, a number of nuts and a number of washers have been installed over first alignment socket 1108, second alignment socket 1110, and third alignment socket 1112 to form number of fastener assemblies 1402. Specifically, first number of nuts and number of washers 1404 are installed over first alignment socket 1108 to form first fastener assembly 1406. Second number of nuts and number of washers 1408 are installed over second alignment socket 1110 to form second fastener assembly 1410. Third number of nuts and number of washers 1412 are installed over third alignment socket 1112 to form third fastener assembly 1414. As depicted, first number of nuts and number of washers 1404, second number of nuts and number of washers 1408, third number of nuts and number of washers 1412 contain the same number and types of washers and nuts. Accordingly, each of first fastener assembly 1406, second fastener assembly 1410, and third fastener assembly 1414 contain the same components. However, in some illustrative examples, at least one of first fastener assembly 1406, second fastener assembly 1410, or third fastener assembly 1414 may differ from the remaining fastener assemblies.

Figure 15:
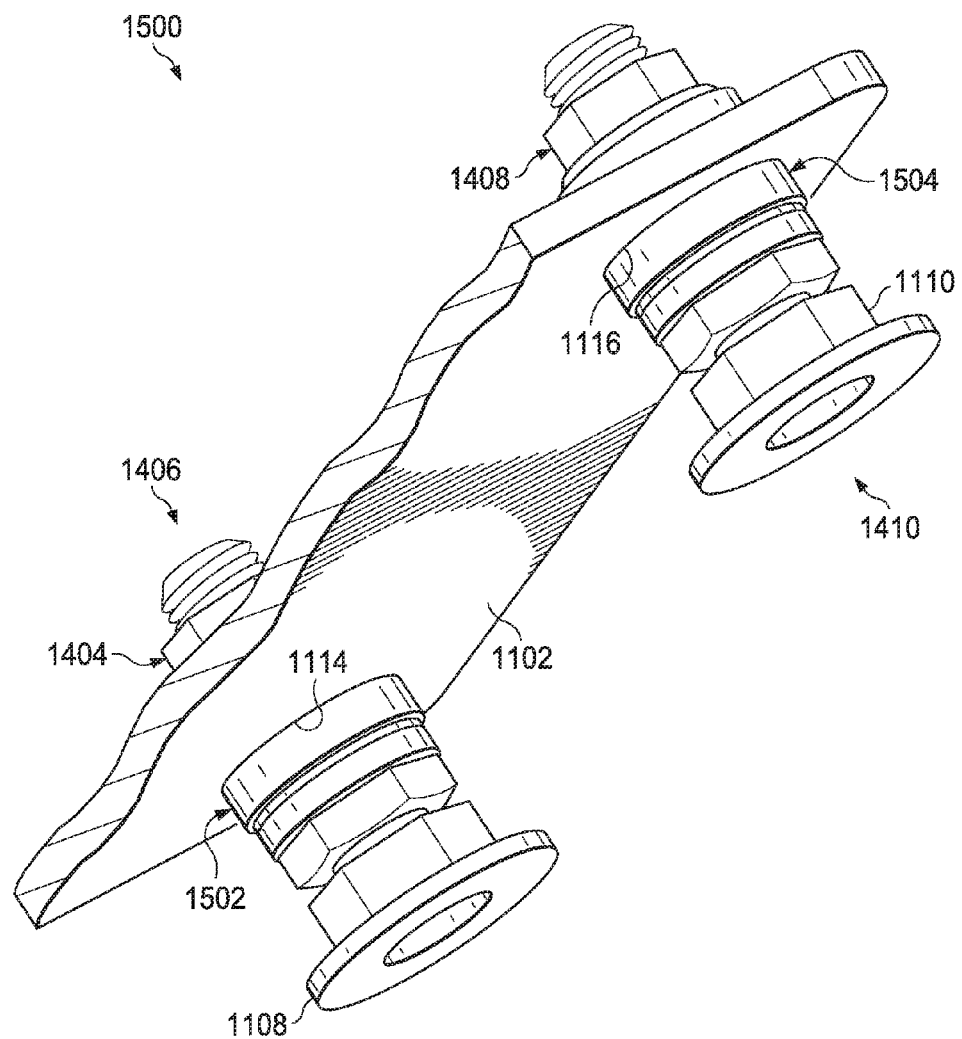
FIG. 15 is an illustration of installed fastener assemblies and a bracket in accordance with an illustrative embodiment.

Turning now to FIG. 15, an illustration of installed fastener assemblies and a bracket is depicted in accordance with an illustrative embodiment. Specifically, view 1500 is a view of bracket 1102, first fastener assembly 1406, and second fastener assembly 1410 within box 15-15 (1) from direction 15-15 (2).

View 1500 may be a view of bracket 1102, first fastener assembly 1406, and second fastener assembly 1410 after removal of alignment tool 700. As can be seen from view 1500, first fastener assembly 1406 includes first alignment socket 1108, first number of nuts and number of washers 1404, and number of nuts and number of washers 1502. Number of nuts and number of washers 1502 may be positioned on first alignment socket 1108 before positioning first alignment socket 1108 through first hole 1114. Second fastener assembly 1410 includes second alignment socket 1110, second number of nuts and number of washers 1408, and number of nuts and number of washers 1504. Number of nuts and number of washers 1504 may be positioned on second alignment socket 1110 before positioning second alignment socket 1110 through second hole 1116.

Figure 16:
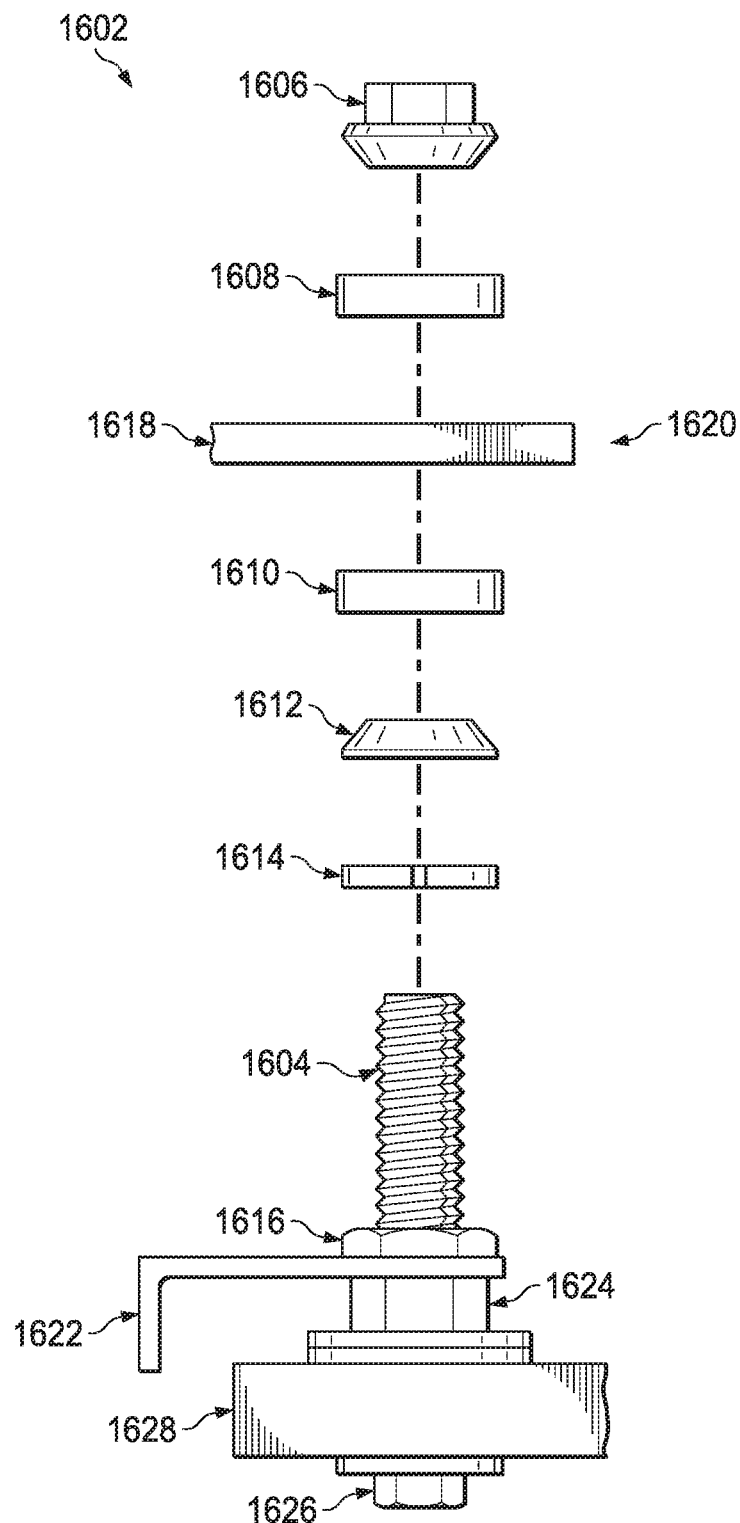
FIG. 16 is an illustration of an exploded view of one implementation of a fastener assembly, a captive assembly, and a flange in accordance with an illustrative embodiment.

Turning now to FIG. 16, an illustration of an exploded view of one implementation of a fastener assembly, a captive assembly, and a flange is depicted in accordance with an illustrative embodiment. Fastener assembly 1602 may be a physical embodiment of a fastener assembly of number of fastener assemblies 326 of FIG. 3. Fastener assembly 1602 has the same components as first fastener assembly 1406 of FIG. 15.

Fastener assembly 1602 consists of alignment socket 1604, self-locking self-aligning nut 1606, self-aligning concave washer 1608, self-aligning concave washer 1610, self-aligning convex washer 1612, lock washer 1614, and jam nut 1616. Flange 1618 of mounting bracket 1620 is positioned between self-aligning concave washer 1608 and self-aligning concave washer 1610. Spacer 1622 is positioned between jam nut 1616 and head 1624 of alignment socket 1604. Spacer 1622 may create a desired amount of space between jam nut 1616 and head 1624 of alignment socket 1604. Spacer 1622 may be removed following installation of fastener assembly 1602.

Captive fastener 1626 is connected to alignment socket 1604. Captive fastener 1626 is part of tool 1628. In some illustrative examples, tool 1628 may be an alignment tool such as alignment tool 304 of FIG. 3. In some illustrative examples, tool 1628 may be head-up display projector 322 of FIG. 3.

Figure 17:
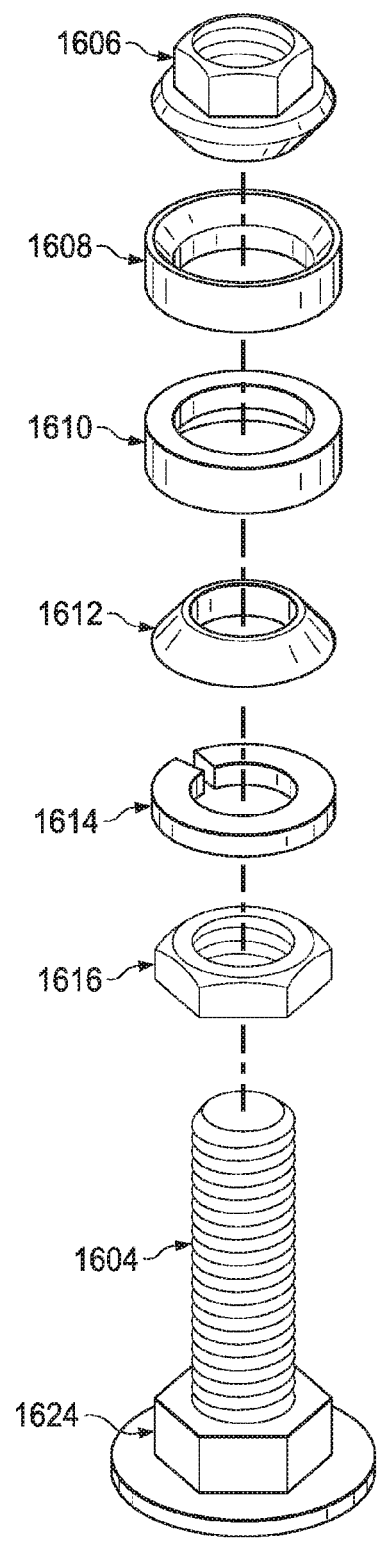
FIG. 17 is an illustration of an exploded view of a fastener assembly in accordance with an illustrative embodiment.

Turning now to FIG. 17, an illustration of an exploded view of a fastener assembly is depicted in accordance with an illustrative embodiment. Fastener assembly 1602 is depicted without any of mounting bracket 1620, spacer 1622, captive fastener 1626, and tool 1628 of FIG. 16.

Figure 18:
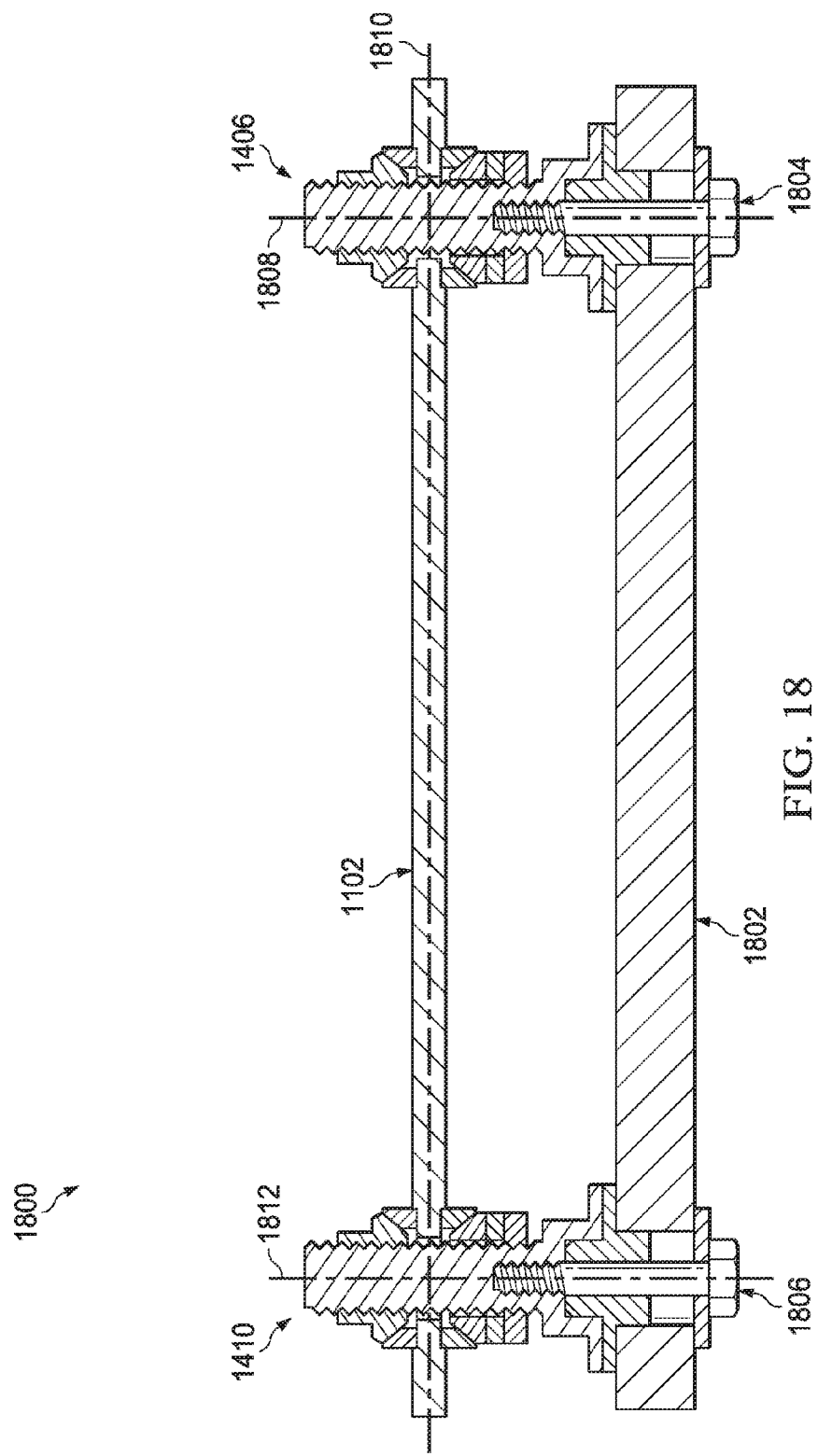
FIG. 18 is an illustration of a cross-sectional view of two installed fastener assemblies in a bracket in accordance with an illustrative embodiment.

Turning now to FIG. 18, an illustration of a cross-sectional view of two installed fastener assemblies in a bracket is depicted in accordance with an illustrative embodiment. View 1800 may be a view of bracket 1102, first fastener assembly 1406, and second fastener assembly 1410, within box 15-15 (1) with cross-section 18-18(1) from direction 18-18(2). View 1800 includes tool 1802. Tool 1802 may be a physical embodiment of part of alignment tool 304 or head-up display projector 322 of FIG. 3.

As can be seen from view 1800, first captive fastener 1804 of tool 1802 is connected to first fastener assembly 1406. Second captive fastener 1806 of tool 1802 is connected to second fastener assembly 1410. Tool 1802 is mounted to bracket 1102 by connecting first captive fastener 1804 and second captive fastener 1806 to first fastener assembly 1406 and second fastener assembly 1410, respectively.

As can be seen from view 1800, in this illustrative example, tool 1802 is about parallel to bracket 1102. In other words, axis 1808 of first fastener assembly 1406 is approximately perpendicular to plane 1810 of bracket 1102. Further, axis 1812 of second fastener assembly 1410 is approximately perpendicular to plane 1810 of bracket 1102.

Figure 19:
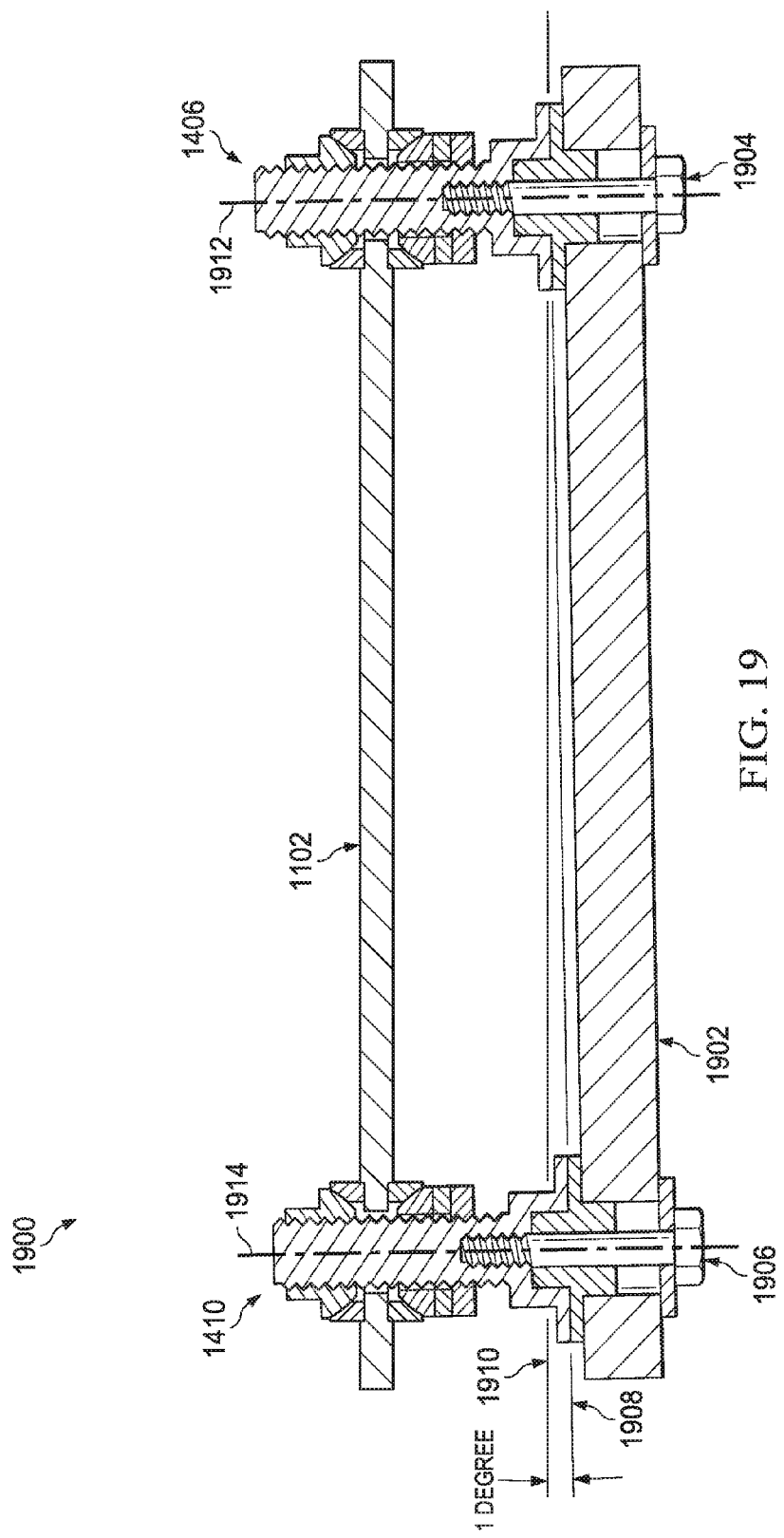
FIG. 19 is an illustration of a cross-sectional view of two fastener assemblies installed at an angle in a bracket in accordance with an illustrative embodiment.

Turning now to FIG. 19, an illustration of a cross-sectional view of two fastener assemblies installed at an angle in a bracket in accordance with an illustrative embodiment. Specifically, view 1900 may be a view of bracket 1102, first fastener assembly 1406, and second fastener assembly 1410, within box 15-15 (1) with cross-section 18-18(1) from direction 18-18(2). View 1900 includes tool 1902. Tool 1902 may be a physical embodiment of part of alignment tool 304 or head-up display projector 322 of FIG. 3.

As can be seen from view 1900, first captive fastener 1904 of tool 1902 is connected to first fastener assembly 1406. Second captive fastener 1906 of tool 1902 is connected to second fastener assembly 1410. Tool 1902 is mounted to bracket 1102 by connecting first captive fastener 1904 and second captive fastener 1906 to first fastener assembly 1406 and second fastener assembly 1410, respectively.

As can be seen from view 1900, in this illustrative example, plane 1908 of tool 1902 is offset about 1 degree from plane 1910 of bracket 1102. In other words, first fastener assembly 1406 and second fastener assembly 1410 are installed in bracket 1102 such that tool 1902 is held at a 1 degree angle to bracket 1102. As depicted, axis 1912 of first fastener assembly 1406 is not perpendicular to plane 1910 of bracket 1102. Further, axis 1914 of second fastener assembly 1410 is not perpendicular to plane 1910 of bracket 1102. In some illustrative examples, tool 1902 may be held at an angle up to 8 degrees from bracket 1102.

Figure 20:
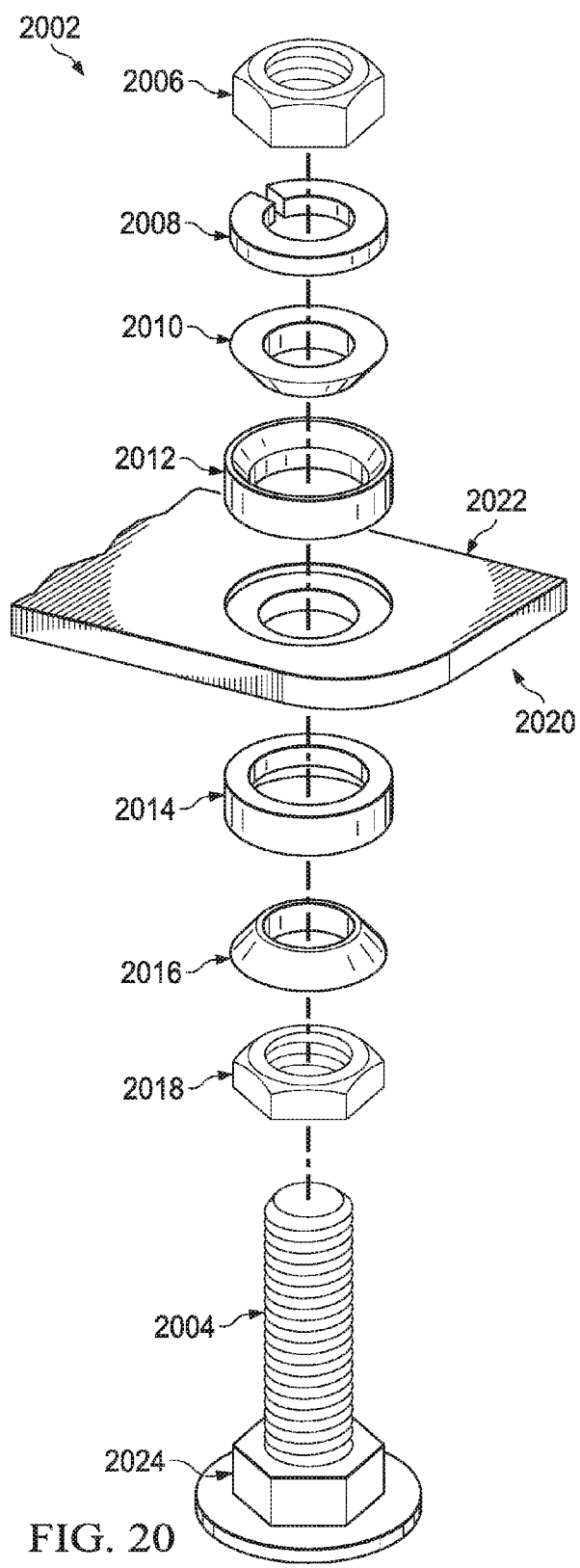
FIG. 20 is an illustration of an exploded view of one implementation of a fastener assembly in accordance with an illustrative embodiment.

Turning now to FIG. 20, an illustration of an exploded view of one implementation of a fastener assembly is depicted in accordance with an illustrative embodiment. Fastener assembly 2002 may be a physical embodiment of a fastener assembly of number of fastener assemblies 326 in FIG. 3. Fastener assembly 2002 has a different set of components than first fastener assembly 1406 of FIG. 14.

Fastener assembly 2002 consists of alignment socket 2004, jam nut 2006, lock washer 2008, self-aligning convex washer 2010, self-aligning concave washer 2012, self-aligning concave washer 2014, self-aligning convex washer 2016, and jam nut 2018. Flange 2020 of mounting bracket 2022 is positioned between self-aligning concave washer 2012 and self-aligning concave washer 2014.

Other components may be included in some illustrative examples. For example, a spacer may be placed between jam nut 2018 and head 2024 of alignment socket 2004.

Both fastener assembly 2002 and fastener assembly 1602 in FIG. 16 have two self-aligning concave washers, a lock washer, a number of jam nuts, and a self-aligning convex washer. Further, in use, the two self-aligning concave washers of both fastener assembly 2002 and fastener assembly 1602 are separated by a flange. Both fastener assembly 2002 and fastener assembly 1602 have an alignment socket positioned within each of the two self-aligning concave washers, the lock washer, the number of jam nuts, and the self-aligning convex washer. This alignment socket is configured to accept a captive fastener. Further, a gap is present between a jam nut of the number of jam nuts and a head of the alignment socket when installed. Although only two examples of fastener assemblies are provided, other illustrative examples may provide for one or more of these features.

Both fastener assembly 2002 and fastener assembly 1602 have an alignment socket and a number of washers and nuts which maintain the alignment of the fastener assembly without potting material. The number of washers and nuts may be removed and reinstalled. Thus, the fastener assemblies may be adjustable. In fastener assembly 1602, the number of washers and nuts comprises two self-aligning concave washers, a lock washer, a jam nut, a self-locking self-aligning nut, and a self-aligning convex washer. In fastener assembly 2002, the number of washers and nuts comprises two self-aligning concave washers, two self-aligning convex washers, a lock washer, and two jam nuts.

Figure 21:
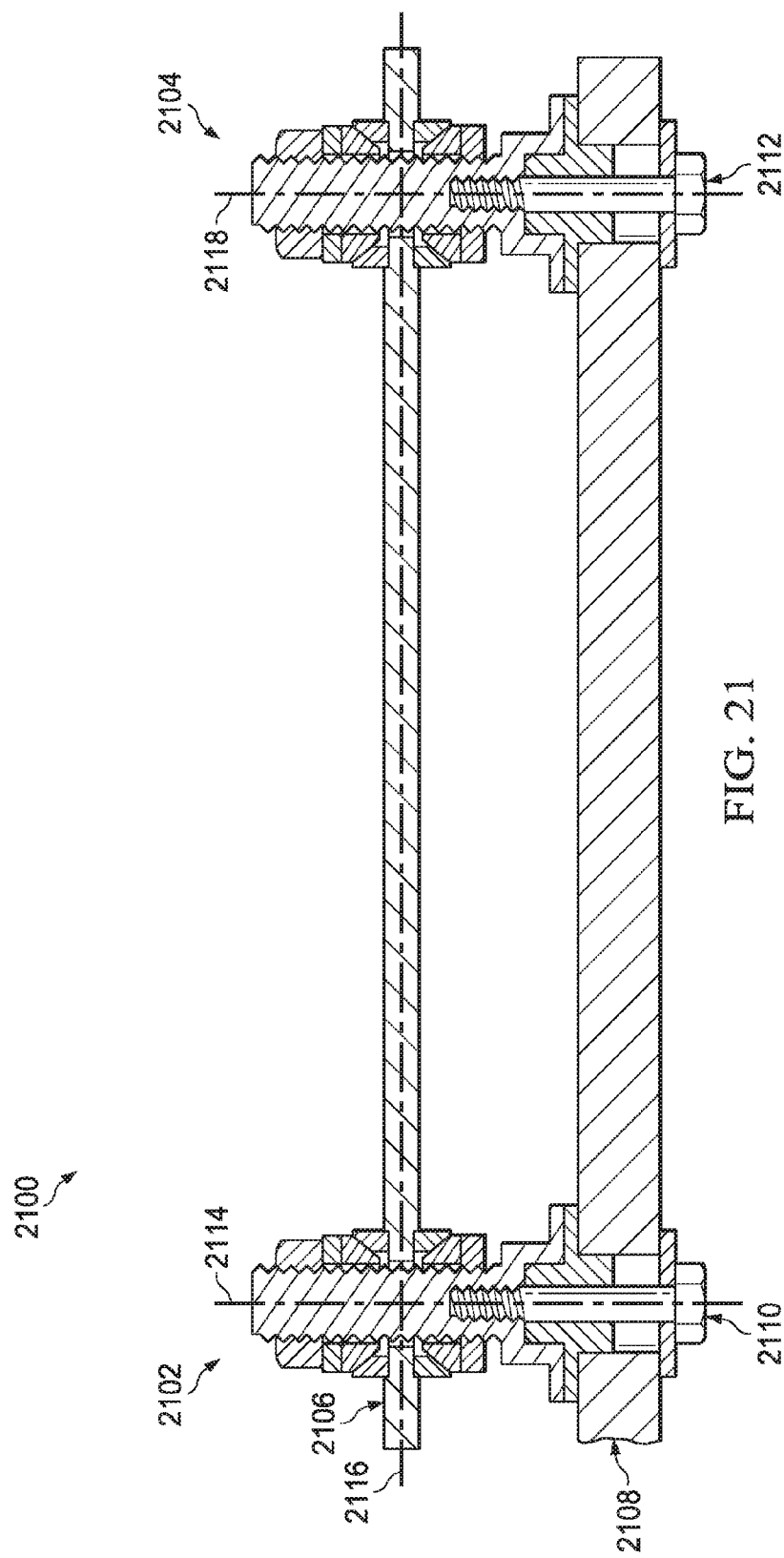
FIG. 21 is an illustration of a cross-sectional view of two installed fastener assemblies in a bracket in accordance with an illustrative embodiment.

Turning now to FIG. 21, an illustration of a cross-sectional view of two installed fastener assemblies in a bracket is depicted in accordance with an illustrative embodiment. Specifically, view 2100 may be a view of first fastener assembly 2102 and second fastener assembly 2104, each of which has the components of fastener assembly 2002 of FIG. 20. First fastener assembly 2102 and second fastener assembly 2104 may be examples of number of fastener assemblies 326 of FIG. 3.

First fastener assembly 2102 and second fastener assembly 2104 are installed in bracket 2106. Tool 2108 is mounted to bracket 2106 using first fastener assembly 2102 and second fastener assembly 2104. Specifically, first captive fastener 2110 of tool 2108 is connected to first fastener assembly 2102. Second captive fastener 2112 of tool 2108 is connected to second fastener assembly 2104. Tool 2108 may be a physical embodiment of part of alignment tool 304 or head-up display projector 322 of FIG. 3.

As can be seen from view 2100, in this illustrative example, tool 2108 is about parallel to bracket 2106. In other words, axis 2114 of first fastener assembly 2102 is approximately perpendicular to plane 2116 of bracket 2106. Further, axis 2118 of second fastener assembly 2104 is approximately perpendicular to plane 2116 of bracket 2106.

The illustration of manufacturing environment 300 in FIG. 3, alignment tool depictions in FIGS. 4, 6-11, and 14, and fastener assembly depictions in FIGS. 5 and 15-21 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although mounting bracket 324 is depicted as having flange 342 and flange 344, other configurations for mounting structures are considered. For example, rather than mounting bracket 324, head-up display projector 322 may be connected to a plurality of structures. As another example, mounting bracket 324 may have a single flange containing first hole 350, second hole 352, and third hole 354. As yet a further example, mounting bracket 324 may have three flanges, each containing a respective hole of first hole 350, second hole 352, and third hole 354.

Further, number of fastener assemblies 326 need not include first fastener assembly 336, second fastener assembly 338, and third fastener assembly 340. Number of fastener assemblies 326 may contain any number of fastener assemblies, including fewer than or greater than three fastener assemblies. Likewise, number of captive fasteners 329 may contain a number of captive fasteners greater than or fewer than three.

Yet further, number of clamps 732 may take the form of other mechanisms to secure alignment tool 700 to a bracket. For example, rather than number of clamps 732, alignment tool 700 may have screws, magnets, suction cups, or any other desirable mechanisms.

Also, alignment tool 400 may not be used to install fastener assemblies. In these illustrative examples, alignment tool 400 may be used to check the alignment of fastener assemblies. In these illustrative examples, alignment tool 400 may not have number of clamps 424. Further, in these illustrative examples, alignment tool 400 may not have number of alignment adjusters 426.

The different components shown in FIGS. 1-2 and 6-21 may be combined with components in FIGS. 3-5, used with components in FIGS. 3-5, or a combination of the two. Additionally, some of the components in FIGS. 1-2 and 6-21 may be illustrative examples of how components shown in block form in FIG. 3-5 may be implemented as physical structures.

Figure 22:
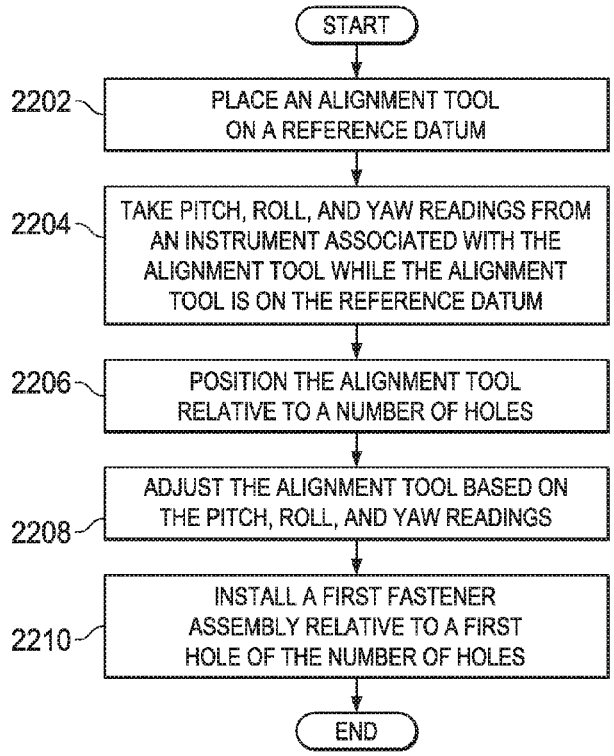
FIG. 22 is an illustration of a flowchart of a process for installing a fastener assembly using an alignment tool in accordance with an illustrative embodiment.

Turning now to FIG. 22, an illustration of a flowchart of a process for installing a fastener assembly using an alignment tool is depicted in accordance with an illustrative embodiment. This process may be used in manufacturing environment 300 in FIG. 3 perform alignment of a head-up display projector.

The process begins by placing an alignment tool on a reference datum (operation 2202). The alignment tool may be alignment tool 304 of FIG. 3. Further, the alignment tool may be alignment tool 700 of FIG. 7 or alignment tool 600 of FIG. 6. In some illustrative examples, the reference datum may be a golden triangle, such as golden triangle 1004 of FIG. 10. The reference datum may be positioned above the wing box of an aircraft.

The process then takes pitch, roll, and yaw readings from an instrument associated with the alignment tool while the alignment tool is on the reference datum (operation 2204). In some illustrative examples, the instrument may be at least one of a magnetic compass or a digital inclinometer. The pitch, roll, and yaw readings may indicate alignment of an aircraft. The instrument may be associated with a base of the alignment tool.

The process then positions the alignment tool relative to a number of holes (operation 2206). In some illustrative examples, prior to positioning the alignment tool relative to the number of holes, a number of alignment sockets may be attached to the alignment tool. In these illustrative examples, positioning the alignment tool relative to the number of holes includes sending a portion of a first alignment socket of the number of alignment sockets through the first hole. In some illustrative examples, positioning the alignment tool relative to the number of holes comprises securing the alignment tool to a bracket containing the hole using a number of clamps of the alignment tool.

The process then adjusts the alignment tool based on the pitch, roll, and yaw readings (operation 2208). In some illustrative examples, the alignment tool may be adjusted so that the current pitch, roll, and yaw readings from the instrument are substantially the same as the pitch, roll, and yaw readings taken while the alignment tool is on the reference datum.

The process then installs a first fastener assembly relative to a first hole of the number of holes (operation 2210). Afterwards, the process terminates. In some illustrative examples, installing the first fastener assembly relative to the first hole comprises installing a first self-aligning concave washer and a first nut over the first alignment socket, the first nut being selected from a jam nut or a self-locking self-aligning nut. The first fastener assembly may maintain its alignment without the use of potting material.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, there may be further operations performed prior to or following termination of the method. In some illustrative examples, a number of centering guides may be attached to the bracket relative to the number of holes. This number of centering guides may be attached to the bracket prior to or at the same time as positioning the alignment tool relative to the number of holes.

Further, in some illustrative examples, a first centering guide of the number of centering guides may be removed. This first centering guide may be associated with the first alignment socket of the number of alignment sockets. The first centering guide may be removed prior to installing a first self-aligning concave washer and a first nut over the first alignment socket. The first nut may be a jam nut or a self-locking self-aligning nut.

Yet further, in some illustrative examples, the pitch, roll, and yaw readings of the alignment tool may be checked after installing the first self-aligning concave washer and the first nut over the first alignment socket. Afterwards, it may be determined if the pitch, roll, and yaw readings of the alignment tool are acceptable. Upon determining the pitch, roll, and yaw readings are unacceptable, the first nut may be loosened. The alignment tool may then be adjusted. Afterwards, the first nut may be tightened. Upon determining the pitch, roll, and yaw readings are acceptable, a second centering guide of the number of centering guides may be removed. The second centering guide is associated with a second alignment socket of the number of alignment sockets.

Figure 23:
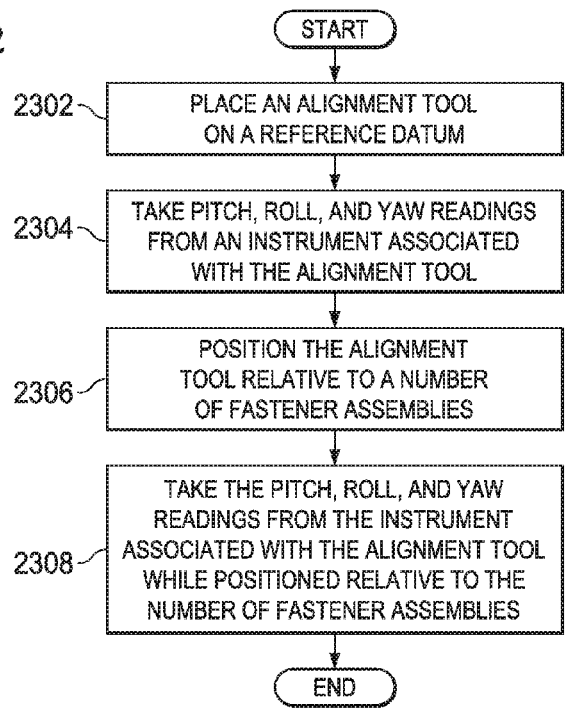
FIG. 23 is an illustration of a flowchart of a process for checking an alignment of a number of fastener assemblies using an alignment tool in accordance with an illustrative embodiment.

Turning now to FIG. 23, an illustration of a flowchart of a process for checking an alignment of a number of fastener assemblies using an alignment tool is depicted in accordance with an illustrative embodiment. The process may begin by placing an alignment tool on a reference datum (operation 2302). The alignment tool may be alignment tool 304 of FIG. 3. Further, the alignment tool may be alignment tool 700 of FIG. 7 or alignment tool 600 of FIG. 6. In some illustrative examples, the reference datum may be a golden triangle, such as golden triangle 1004 of FIG. 10. The reference datum may be positioned above the wing box of an aircraft.

The process may then take pitch, roll, and yaw readings from an instrument associated with the alignment tool (operation 2304). In some illustrative examples, the instrument may be at least one of a magnetic compass and a digital inclinometer. The pitch, roll, and yaw readings may indicate alignment of an aircraft. The instrument may be associated with a base of the alignment tool.

The process may then position the alignment tool relative to a number of fastener assemblies (operation 2306). In some illustrative examples, the alignment tool may be positioned relative to the number of fastener assemblies by connecting a number of captive fasteners of the alignment tool to the number of fastener assemblies.

The process may then take the pitch, roll, and yaw readings from the instrument associated with the alignment tool while positioned relative to the number of fastener assemblies (operation 2308). Afterwards, the process terminates.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, there may be further operations performed following termination of the method. In some illustrative examples, the process may further include determining if the pitch, roll, and yaw readings from the instrument associated with the alignment tool while positioned relative to the number of fastener assemblies are acceptable. Further, upon determining the pitch, roll, and yaw are unacceptable, the process may further include loosening a nut from a first alignment socket of the number of fastener assemblies, adjusting the alignment tool, and tightening the nut over the first alignment socket, wherein the nut is a jam nut or a self-locking self-aligning nut.

Figure 24:
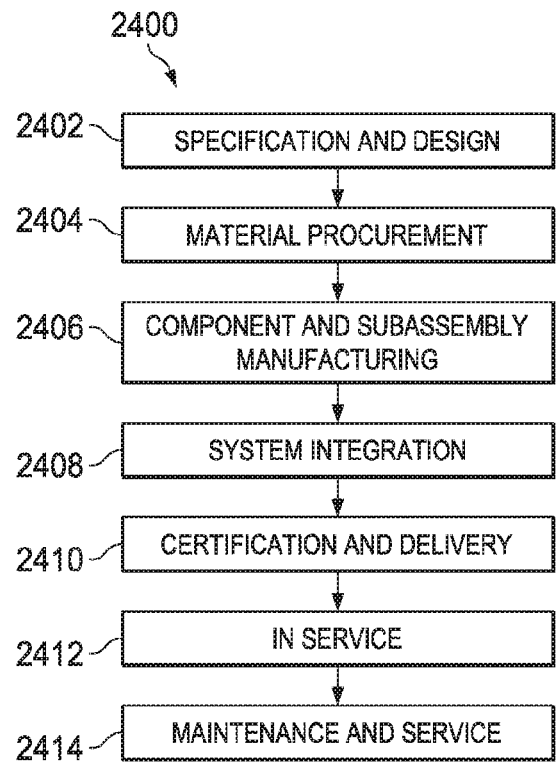
FIG. 24 is an illustration of a block diagram of an aircraft manufacturing and service method in accordance with an illustrative embodiment.
Figure 25:
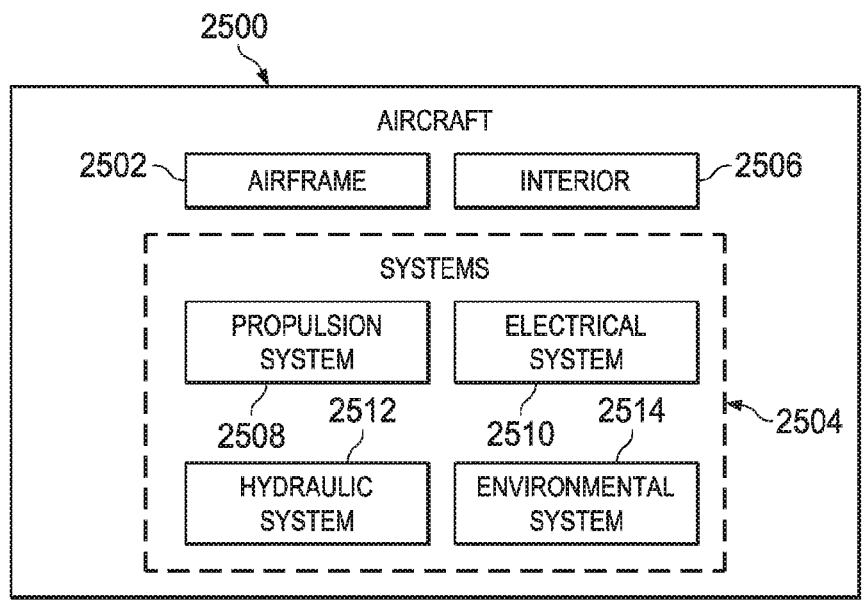
FIG. 25 is an illustration of a block diagram of an aircraft in which an illustrative embodiment may be implemented.

The illustrative embodiments of the disclosure may be described in the context of aircraft manufacturing and service method 2400 as shown in FIG. 24 and aircraft 2500 as shown in FIG. 25. Turning first to FIG. 24, an illustration of a block diagram of an aircraft manufacturing and service method is depicted in accordance with an illustrative embodiment. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of a block diagram of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 2400 in FIG. 24. One or more illustrative embodiments may be used during component and subassembly manufacturing 2406. For example, number of fastener assemblies 326 may be used during component and subassembly manufacturing 2406. Further, alignment tool 304 may also be used to check alignment of fastener assemblies during maintenance and service 2414.

The tool of the illustrative embodiments may provide for at least one of installing and checking the alignment of a number of fastener assemblies. In one illustrative embodiment, the tool comprises a base having an instrument platform and an alignment portion having a footprint of a head-up display projector of an aircraft. This instrument platform may interface with at least one of a magnetic compass or a digital inclinometer. The tool may further comprise a number of captive fasteners. The number of captive fasteners may be accepted by a number of alignment sockets of a number of fastener assemblies, the number of fastener assemblies configured to maintain orientation without potting material. The tool may further comprise a number of alignment adjusters to adjust at least one of pitch, roll, and yaw readings of the tool, and a number of clamps.

In another illustrative embodiment, a tool comprises a base having a first face configured to contact a reference datum, an instrument platform on a second face, and an alignment feature; and an alignment portion having a number of captive fasteners. The alignment portion may have a footprint of a head-up display projector of an aircraft. The tool may further comprise a number of alignment adjusters to adjust at least one of pitch, roll, and yaw readings of the tool, and a number of clamps. The number of captive fasteners may be accepted by a number of alignment sockets of a number of fastener assemblies, the number of fastener assemblies configured to maintain orientation without potting material.

By installing fastener assemblies according to the illustrative embodiments, manufacturing time may be reduced.

The alignment of fastener assemblies may be checked more quickly than using laser trackers or other conventional methods. Additionally, the reinstallation or adjustment of the alignment of fastener assemblies may be done more quickly than by removing potting material of current fasteners. Further, installing fastener assemblies without potting material may reduce manufacturing time by eliminating the time for curing the potting material.

Additionally, by installing the fastener assemblies disclosed, manufacturing costs may be reduced. For example, the fastener assemblies may be loosened and realigned without having to remove potting material.

Using the alignment tool of the illustrative embodiments may allow for checking alignment or installing fastener assemblies without highly specialized or experienced personnel. Further, the disclosed alignment tool may be used in outdoor environments.

This illustrative example of mounting a head-up display projector, such as head-up display projector 322 of aircraft 302, is provided for purposes of illustrating one tool for which the different illustrative embodiments may be implemented. The illustrative examples are not meant to imply architectural limitations as to the manner in which different illustrative embodiments may be implemented. For example, alignment tool 304 may have a footprint of any desirable tool which is to be mounted using a number of fastener assemblies. The different illustrative embodiments may be applied to other types of tools, structures, or items to be aligned and mounted.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A tool comprising:
a base having a first face configured to contact a reference datum, an instrument platform on a second face, and a positioning feature on a third face; and
an alignment portion attached to the base and having a footprint of a head-up display projector of an aircraft.

2. The tool of claim 1 further comprising:
a number of captive fasteners on the alignment portion.

3. The tool of claim 2 further comprising:
a number of alignment adjusters on the alignment portion to adjust at least one of pitch, roll, and yaw of the tool; and
a number of clamps on the alignment portion.

4. The tool of claim 2, wherein the number of captive fasteners are configured to be accepted by a number of alignment sockets of a number of fastener assemblies, the number of fastener assemblies configured to maintain orientation without potting material.

5. The tool of claim 1, wherein the instrument platform interfaces with a magnetic compass or a digital inclinometer.

6. A tool comprising:
a base having a first face configured to contact a reference datum, an instrument platform on a second face, and a positioning feature on a third face; and an alignment portion attached to the base and having a number of captive fasteners.

7. The tool of claim 6, wherein the alignment portion has a footprint of a head-up display projector of an aircraft.

8. The tool of claim 6 further comprising:
a number of clamps on the alignment portion; and
a number of alignment adjusters on the alignment portion to adjust at least one of pitch, roll, and yaw of the tool.

9. The tool of claim 6, wherein the instrument platform is configured to interface with a magnetic compass or a digital inclinometer.

10. The tool of claim 6, wherein the number of captive fasteners are configured to be accepted by a number of alignment sockets of a number of fastener assemblies, the number of fastener assemblies configured to maintain orientation without potting material.

11. A method comprising:
placing an alignment tool on a reference datum;
taking pitch, roll, and yaw readings from an instrument associated with the alignment tool while the alignment tool is on the reference datum;
positioning the alignment tool relative to a number of holes;
adjusting the alignment tool based on the pitch, the roll, and the yaw readings; and
installing a first fastener assembly relative to a first hole of the number of holes.

12. The method of claim 11 further comprising:
attaching a number of alignment sockets to the alignment tool, and wherein positioning the alignment tool relative to the number of holes includes sending a portion of a first alignment socket of the number of alignment sockets through the first hole.

13. The method of claim 12, wherein installing the first fastener assembly relative to the first hole comprises installing a first self-aligning concave washer and a first nut over the first alignment socket, the first nut being selected from a jam nut or a self-locking self-aligning nut.

14. The method of claim 12, wherein positioning the alignment tool relative to the number of holes comprises securing the alignment tool to a bracket containing the first hole using a number of clamps of the alignment tool.

15. The method of claim 14, wherein installing the first fastener assembly relative to the first hole of the number of holes comprises installing a first self-aligning concave washer and a first nut over the first alignment socket, wherein the first nut is a jam nut or a self-locking self-aligning nut, and the method further comprising:
attaching a number of centering guides to the bracket relative to the number of holes; and
removing a first centering guide of the number of centering guides, the first centering guide associated with the first alignment socket of the number of alignment sockets.

16. The method of claim 15 further comprising:
checking the pitch, the roll, and the yaw of the alignment tool after installing the first self-aligning concave washer and the first nut over the first alignment socket;
determining if the pitch, the roll, and the yaw of the alignment tool are acceptable; and
upon determining the pitch, roll, and yaw are unacceptable, loosening the first nut, adjusting the alignment tool, and tightening the first nut.

17. The method of claim 15 further comprising:
checking the pitch, the roll, and the yaw of the alignment tool after installing the first self-aligning concave washer and the first nut over the first alignment socket;
determining if the pitch, the roll, and the yaw of the alignment tool are acceptable;
upon determining the pitch, the roll, and the yaw are acceptable, removing a second centering guide of the number of centering guides, the second centering guide associated with a second alignment socket of the number of alignment sockets; and
installing a second self-aligning concave washer and a second self-locking self-aligning nut over the second alignment socket.

18. The method of claim 15, wherein positioning the alignment tool relative to the number of holes of the bracket comprises securing the alignment tool to the bracket with the number of clamps of the alignment tool.

19. A method comprising:
placing an alignment tool on a reference datum;
taking pitch, roll, and yaw readings from an instrument associated with the alignment tool while the alignment tool is on the reference datum;
positioning the alignment tool relative to a number of fastener assemblies; and
taking pitch, roll, and yaw readings from the instrument associated with the alignment tool while positioned relative to the number of fastener assemblies.

20. The method of claim 19 further comprising:
determining if the pitch, the roll, and the yaw readings from the instrument associated with the alignment tool while positioned relative to the number of fastener assemblies are acceptable; and
upon determining the pitch, the roll, and the yaw are unacceptable, loosening a nut from a first alignment socket of the number of fastener assemblies, adjusting the alignment tool, and tightening the nut over the first alignment socket, wherein the nut is a jam nut or a self-locking self-aligning nut.

* * * * *